United States Patent
Wang et al.

(10) Patent No.: US 12,382,521 B2
(45) Date of Patent: Aug. 5, 2025

(54) RELAY CONNECTION ESTABLISHMENT METHOD AND DEVICE

(71) Applicant: VIVO MOBILE COMMUNICATION CO., LTD., Guangdong (CN)

(72) Inventors: Wen Wang, Guangdong (CN); Zhenhua Xie, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 327 days.

(21) Appl. No.: 17/727,295

(22) Filed: Apr. 22, 2022

(65) Prior Publication Data
US 2022/0248484 A1 Aug. 4, 2022

Related U.S. Application Data

(63) Continuation of application No. PCT/CN2020/127162, filed on Nov. 6, 2020.

(30) Foreign Application Priority Data

Nov. 7, 2019 (CN) .......................... 201911084348.2

(51) Int. Cl.
*H04W 76/14* (2018.01)
*H04W 76/15* (2018.01)
*H04W 88/04* (2009.01)

(52) U.S. Cl.
CPC ........... *H04W 76/14* (2018.02); *H04W 76/15* (2018.02); *H04W 88/04* (2013.01)

(58) Field of Classification Search
CPC ..... H04W 64/00; H04W 72/25; H04W 76/14; H04W 36/0085; H04W 36/00837;
(Continued)

(56) References Cited

U.S. PATENT DOCUMENTS 9,749,914 B2 * 8/2017 Chai ................. H04W 36/0085
2016/0270134 A1 9/2016 Stojanovski
(Continued)

FOREIGN PATENT DOCUMENTS

| CN | 104125620 A | 10/2014 |
| CN | 106888494 A | 6/2017 |

(Continued)

OTHER PUBLICATIONS

First Office Action for Chinese Application No. 201911084348.2, dated Aug. 2, 2022, 13 Pages.
(Continued)

*Primary Examiner* — David Q Nguyen
(74) *Attorney, Agent, or Firm* — BROOKS KUSHMAN P.C.

(57) ABSTRACT

Relay connection establishment method and device are disclosed. The method includes: sending, by source UE, a first direct communication request message to next-hop relay UE of the source UE, where the first direct communication request message is used to request to establish, in a process of establishing a relay connection from the source UE to target UE, a first direct communication connection between the source UE and the next-hop relay UE of the source UE; and receiving a first direct communication accept message from the next-hop relay UE of the source UE, where the first direct communication accept message is used to indicate acceptance of the request for establishing the first direct communication connection in the process of establishing the relay connection.

14 Claims, 10 Drawing Sheets

(58) Field of Classification Search
CPC ......... H04W 36/0058; H04W 36/0016; H04W 36/0064; H04W 76/15; H04W 76/11; H04W 88/04
USPC .............................. 370/328, 329, 330, 315
See application file for complete search history.

(56) References Cited

U.S. PATENT DOCUMENTS

| | | | |
|---|---|---|---|
| 2017/0071028 A1* | 3/2017 | Kuo | ............. H04W 8/06 |
| 2017/0142594 A1 | 5/2017 | Zhang | |
| 2018/0098370 A1 | 4/2018 | Bangolae et al. | |
| 2018/0213590 A1 | 7/2018 | Lee et al. | |
| 2018/0343556 A1 | 11/2018 | Wang et al. | |
| 2019/0028177 A1 | 1/2019 | Feng | |
| 2019/0261441 A1 | 8/2019 | Chae et al. | |
| 2021/0409263 A1* | 12/2021 | Kuo | ............. H04W 88/04 |

FOREIGN PATENT DOCUMENTS

| | | | |
|---|---|---|---|
| CN | 107211264 A | 9/2017 | |
| CN | 107637162 A | 1/2018 | |
| CN | 108307472 A | 7/2018 | |
| CN | 108476496 A | 8/2018 | |
| EP | 2833694 A2 | 2/2015 | |
| EP | 3370473 A1 * | 9/2018 | ........ H04W 36/0022 |
| EP | 3402246 A1 | 11/2018 | |
| JP | 2019505134 A | 2/2019 | |
| WO | 2012088470 A1 | 6/2012 | |
| WO | 2016014425 A2 | 1/2016 | |
| WO | 2016144425 A1 | 9/2016 | |
| WO | 2018031343 A1 | 2/2018 | |

OTHER PUBLICATIONS

International Search Report and Written Opinion for Application No. PCT/CN2020/127162, dated Jan. 27, 2021, 8 Pages.

Renesas Mobile Europe Ltd., "ProSe Communication Using UE-to-UE Relay," SA WG2 Meeting #98, Agenda tem 6.4, Jul. 15-19, 2013, S2-132705, Valencia, Spain, 4 Pages.

CATT, "Consideration About the ProSe UE-UE Relay," SA WG2 Meeting #105, Agenda item 7.13, Oct. 13-17, 2014, S2-143032 (Revision of S2-14xxxx), Sapporo, Japan, 6 Pages.

First Office Action for Japanese Application No. 2022-526132, dated Apr. 12, 2023, 3 Pages.

Extended European Search Report for Application No. 20885525.4-1215, dated Nov. 25, 2022, 8 Pages.

* cited by examiner

RELAY CONNECTION ESTABLISHMENT METHOD AND DEVICE

CROSS-REFERENCE TO RELATED APPLICATIONS

This application is continuation application of PCT International Application No. PCT/CN2020/127162 filed on Nov. 6, 2020, which claims priority to Chinese Patent Application No. 201911084348.2, filed on Nov. 7, 2019, which are incorporated herein by reference in their entireties.

TECHNICAL FIELD

Embodiments of the present invention relate to the field of communications technologies, and in particular, to a relay connection establishment method and a device.

BACKGROUND

Currently, when communication between two user equipments (UE) is required, a direct communication connection is established between the two UEs in a conventional technology. However, in many cases (for example, a distance between the two UEs is relatively long), quality of the direct communication connection established between the two UEs is relatively poor, and even the direct communication connection cannot be established.

SUMMARY

Embodiments of the present invention provide a relay connection establishment method and a device.

According to a first aspect, an embodiment of the present invention provides a relay connection establishment method, applied to source UE, where the method includes: sending a first direct communication request message to next-hop relay UE of the source UE, where the first direct communication request message is used to request to establish, in a process of establishing a relay connection from the source UE to target UE, a first direct communication connection between the source UE and the next-hop relay UE of the source UE; and receiving a first direct communication accept message from the next-hop relay UE of the source UE, where the first direct communication accept message is used to indicate acceptance of the request for establishing the first direct communication connection in the process of establishing the relay connection.

Optionally, the first direct communication request message and the first direct communication accept message both carry an identifier of the source UE, an identifier of the next-hop relay UE of the source UE, and an identifier of the target UE.

According to a second aspect, an embodiment of the present invention provides a relay connection establishment method, applied to target relay UE, where the method includes: receiving a first target direct communication request message from first UE, where the first UE is source UE or previous-hop relay UE of the target relay UE, and the first target direct communication request message is used to request to establish, in a process of establishing a relay connection from the source UE to target UE, a first target direct communication connection between the first UE and the target relay UE; sending a second target direct communication request message to second UE, where the second UE is the target UE or next-hop relay UE of the target relay UE, and the second target direct communication request message is used to request to establish, in the process of establishing the relay connection, a second target direct communication connection between the target relay UE and the second UE; receiving a second target direct communication accept message from the second UE, where the second target direct communication accept message is used to indicate acceptance of the request for establishing the second target direct communication connection in the process of establishing the relay connection; and sending a first target direct communication accept message to the first UE, where the first target direct communication accept message is used to indicate acceptance of the request for establishing, in the process of establishing the relay connection, the first target direct communication connection.

Optionally, in a case in which the first UE is the source UE, the first target direct communication request message and the first target direct communication accept message both carry an identifier of the source UE, an identifier of the target relay UE, and an identifier of the target UE; in a case in which the first UE is the previous-hop relay UE of the target relay UE, the first target direct communication request message and the first target direct communication accept message both carry an identifier of the source UE, an identifier of the first UE, an identifier of the target relay UE, and an identifier of the target UE; in a case in which the second UE is the target UE, the second target direct communication request message and the second target direct communication accept message both carry an identifier of the source UE, an identifier of the target relay UE, and an identifier of the target UE; or in a case in which the second UE is the next-hop relay UE of the target relay UE, the second target direct communication request message and the second target direct communication accept message both carry an identifier of the source UE, an identifier of the target relay UE, an identifier of the second UE, and an identifier of the target UE.

According to a third aspect, an embodiment of the present invention provides a relay connection establishment method, applied to target user equipment UE, where the method includes: receiving a second direct communication request message from previous-hop relay UE of the target UE, where the second direct communication request message is used to request to establish, in a process of establishing a relay connection from source UE to the target UE, a second direct communication connection between the target UE and the previous-hop relay UE of the target UE; and sending a second direct communication accept message to the previous-hop relay UE of the target UE, where the second direct communication accept message is used to indicate acceptance of the request for establishing the second direct communication connection in the process of establishing the relay connection.

Optionally, the second direct communication request message and the second direct communication accept message both carry an identifier of the source UE, an identifier of the previous-hop relay UE of the target UE, and an identifier of the target UE.

According to a fourth aspect, an embodiment of the present invention provides a relay connection establishment method, applied to a network device, where the method includes: receiving a relay connection service request message, where the relay connection service request message is used to request a relay connection service of a relay connection from source UE to target UE; authenticating and authorizing the relay connection service based on the relay connection service request message, and configuring connection configuration parameters of the relay connection service, where the connection configuration parameters include a first connection configuration parameter, a target connection configuration parameter of each relay UE, and a second connection configuration parameter; and sending a relay connection service accept message, where the relay connection service accept message is used to indicate acceptance of the relay connection service request, where the first connection configuration parameter is used for establishing a first direct communication connection between the source UE and next-hop relay UE of the source UE in a process of establishing the relay connection; the target connection configuration parameter is used for establishing a first target direct communication connection between corresponding relay UE and first UE and establishing a second target direct communication connection between the corresponding relay UE and second UE in the process of establishing the relay connection, where the first UE is the source UE or previous-hop relay UE of the corresponding relay UE, and the second UE is the target UE or next-hop relay UE of the corresponding relay UE; and the second connection configuration parameter is used for establishing a second direct communication connection between the target UE and previous-hop relay UE of the target UE in the process of establishing the relay connection.

Optionally, the relay connection service request message carries an identifier of the source UE, an identifier of each relay UE, an identifier of the target UE, requirement information of the relay connection service, and routing information of the relay connection service.

According to a fifth aspect, an embodiment of the present invention provides UE, where the UE is source UE, and the UE includes a sending module and a receiving module, where the sending module is configured to send a first direct communication request message to next-hop relay UE of the source UE, where the first direct communication request message is used to request to establish, in a process of establishing a relay connection from the source UE to target UE, a first direct communication connection between the source UE and the next-hop relay UE of the source UE; and the receiving module is configured to receive a first direct communication accept message from the next-hop relay UE of the source UE, where the first direct communication accept message is used to indicate acceptance of the request for establishing the first direct communication connection in the process of establishing the relay connection.

According to a sixth aspect, an embodiment of the present invention provides UE, where the UE is target relay UE, and the UE includes a receiving module and a sending module, where the receiving module is configured to receive a first target direct communication request message from first UE, where the first UE is source UE or previous-hop relay UE of the target relay UE, and the first target direct communication request message is used to request to establish, in a process of establishing a relay connection from the source UE to target UE, a first target direct communication connection between the first UE and the target relay UE; the sending module is configured to send a second target direct communication request message to second UE, where the second UE is the target UE or next-hop relay UE of the target relay UE, and the second target direct communication request message is used to request to establish, in the process of establishing the relay connection, a second target direct communication connection between the target relay UE and the second UE; the receiving module is further configured to receive a second target direct communication accept message from the second UE, where the second target direct communication accept message is used to indicate acceptance of the request for establishing the second target direct communication connection in the process of establishing the relay connection; and the sending module is further configured to send a first target direct communication accept message to the first UE, where the first target direct communication accept message is used to indicate acceptance of the request for establishing, in the process of establishing the relay connection, the first target direct communication connection.

According to a seventh aspect, an embodiment of the present invention provides UE, where the UE is target UE, and the UE includes a receiving module and a sending module, where the receiving module is configured to receive a second direct communication request message from previous-hop relay UE of the target UE, where the second direct communication request message is used to request to establish, in a process of establishing a relay connection from source UE to the target UE, a second direct communication connection between the target UE and the previous-hop relay UE of the target UE; and the sending module is configured to send a second direct communication accept message to the previous-hop relay UE of the target UE, where the second direct communication accept message is used to indicate acceptance of the request for establishing the second direct communication connection in the process of establishing the relay connection.

According to an eighth aspect, an embodiment of the present invention provides a network device, where the network device includes a receiving module, an authentication and authorization module, a configuration module, and a sending module, where the receiving module is configured to receive a relay connection service request message, where the relay connection service request message is used to request a relay connection service of a relay connection from source UE to target UE; the authentication and authorization module is configured to authenticate and authorize the relay connection service based on the relay connection service request message received by the receiving module; the configuration module is configured to configure connection configuration parameters of the relay connection service, where the connection configuration parameters include a first connection configuration parameter, a target connection configuration parameter of each relay UE, and a second connection configuration parameter; and the sending module is configured to send a relay connection service accept message, where the relay connection service accept message is used to indicate acceptance of the relay connection service request, where the first connection configuration parameter is used for establishing a first direct communication connection between the source UE and next-hop relay UE of the source UE in a process of establishing the relay connection; the target connection configuration parameter is used for establishing a first target direct communication connection between corresponding relay UE and first UE and establishing a second target direct communication connection between the corresponding relay UE and second UE in the process of establishing the relay connection, where the first UE is the source UE or previous-hop relay UE of the corresponding relay UE, and the second UE is the target UE or next-hop relay UE of the corresponding relay UE; and the second connection configuration parameter is used for establishing a second direct communication connection between the target UE and previous-hop relay UE of the target UE in the process of establishing the relay connection.

According to a ninth aspect, an embodiment of the present invention provides UE, where the UE is source UE and includes a processor, a memory, and a computer program stored in the memory and capable of running on the processor, where when the computer program is executed by the processor, steps of the relay connection establishment method according to the first aspect are implemented.

According to a tenth aspect, an embodiment of the present invention provides UE, where the UE is target relay UE and includes a processor, a memory, and a computer program stored in the memory and capable of running on the processor, where when the computer program is executed by the processor, steps of the relay connection establishment method according to the third aspect are implemented.

According to an eleventh aspect, an embodiment of the present invention provides UE, where the UE is target UE and includes a processor, a memory, and a computer program stored in the memory and capable of running on the processor, where when the computer program is executed by the processor, steps of the relay connection establishment method according to the fifth aspect are implemented.

According to a twelfth aspect, an embodiment of the present invention provides a network device, including a processor, a memory, and a computer program stored in the memory and capable of running on the processor, where when the computer program is executed by the processor, steps of the relay connection establishment method according to the seventh aspect are implemented.

According to a thirteenth aspect, an embodiment of the present invention provides a communications system, where the communications system includes the UE according to the fifth aspect, the UE according to the sixth aspect, the UE according to the seventh aspect, and the network device according to the eighth aspect; or the communications system includes the UE according to the ninth aspect, the UE according to the tenth aspect, the UE according to the eleventh aspect, and the network device according to the twelfth aspect, where the UE according to the fifth aspect and the UE according to the ninth aspect are the source UE in the relay connection, the UE according to the sixth aspect and the UE according to the tenth aspect are the target relay UE in the relay connection, and the UE according to the seventh aspect and the UE according to the eleventh aspect are the target UE in the relay connection.

According to a fourteenth aspect, an embodiment of the present invention provides a computer-readable storage medium, where the computer-readable storage medium stores a computer program, and when the computer program is executed by a processor, steps of the relay connection establishment method according to the first aspect, the second aspect, the third aspect, or the fourth aspect are implemented.

In the embodiments of the present invention, the source UE may send the first direct communication request message to the next-hop relay UE of the source UE, and receive the first direct communication accept message from the next-hop relay UE of the source UE, where the first direct communication request message is used to request to establish, in the process of establishing the relay connection from the source UE to the target UE, the first direct communication connection between the source UE and the next-hop relay UE of the source UE; and the first direct communication accept message is used to indicate acceptance of the request for establishing the first direct communication connection in the process of establishing the relay connection.

In the embodiments of the present invention, the target relay UE may receive the first target direct communication request message from the first UE, send the second target direct communication request message to the second UE, receive the second target direct communication accept message from the second UE, and send the first target direct communication accept message to the first UE, where the first UE is the source UE or the previous-hop relay UE of the target relay UE, and the first target direct communication request message is used to request to establish, in the process of establishing the relay connection from the source UE to the target UE, the first target direct communication connection between the first UE and the target relay UE; the second UE is the target UE or the next-hop relay UE of the target relay UE, and the second target direct communication request message is used to request to establish, in the process of establishing the relay connection, the second target direct communication connection between the target relay UE and the second UE; the second target direct communication accept message is used to indicate acceptance of the request for establishing the second target direct communication connection in the process of establishing the relay connection; and the first target direct communication accept message is used to indicate acceptance of the request for establishing, in the process of establishing the relay connection, the first target direct communication connection.

In the embodiments of the present invention, the target UE may receive the second direct communication request message from the previous-hop relay UE of the target UE, and send the second direct communication accept message to the previous-hop relay UE of the target UE, where the second direct communication request message is used to request to establish, in the process of establishing the relay connection from the source UE to the target UE, the second direct communication connection between the target UE and the previous-hop relay UE of the target UE; and the second direct communication accept message is used to indicate acceptance of the request for establishing the second direct communication connection in the process of establishing the relay connection.

In the embodiments of the present invention, the network device may receive the relay connection service request message, authenticate and authorize the relay connection service based on the relay connection service request message, configure the connection configuration parameters of the relay connection service, and send the relay connection service accept message, where the relay connection service request message is used to request the relay connection service of the relay connection from the source UE to the target UE; the connection configuration parameters include the first connection configuration parameter, the target connection configuration parameter of each relay UE, and the second connection configuration parameter; and the relay connection service accept message is used to indicate acceptance of the relay connection service request, where the first connection configuration parameter is used for establishing the first direct communication connection between the source UE and the next-hop relay UE of the source UE in the process of establishing the relay connection; the target connection configuration parameter is used for establishing the first target direct communication connection between the corresponding relay UE and the first UE and establishing the second target direct communication connection between the corresponding relay UE and the second UE in the process of establishing the relay connection, where the first UE is the source UE or the previous-hop relay UE of the corresponding relay UE, and the second UE is the target UE or the next-hop relay UE of the corresponding relay UE; and the second connection configuration parameter is used for establishing the second direct communication connection between the target UE and the previous-hop relay UE of the target UE in the process of establishing the relay connection.

DETAILED DESCRIPTION

Figure 1:
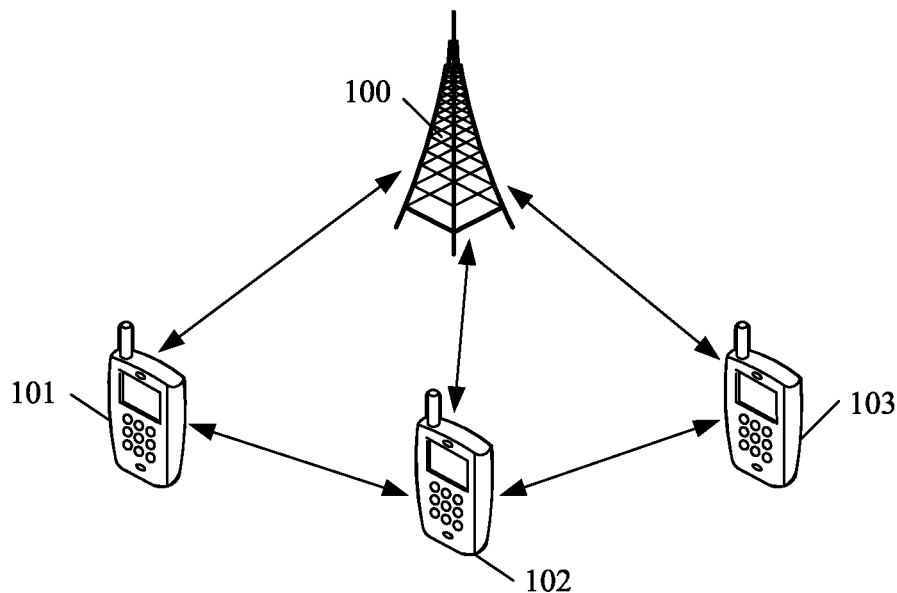
FIG. 1 is a schematic architectural diagram of a communications system according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the embodiments of the present invention, terms such as "an example" or "for example" are used to represent examples, illustrations, or explanations. Any embodiment or design solution described as "an example" or "for example" in the embodiments of the present invention shall not be interpreted to be more preferential or advantageous than other embodiments or design solutions. To be precise, the words such as "an example" or "for example" are intended to present a related concept in a specific manner.

In the description of the embodiments of the present invention, unless otherwise specified, "a plurality" means two or more than two. For example, a plurality of processing units indicates two or more than two processing units, and a plurality of components indicate two or more than two components.

A relay connection technology is a technology of adding a relay node responsible for forwarding communication data between two devices that need to perform wireless communication. The relay connection technology can not only expand cell coverage, compensate for a blind spot in cell coverage, and improve a cell capacity through spatial resource reuse, but also overcome a penetration loss of indoor coverage and improve indoor coverage quality.

Currently, a conventional technology provides only a method about how to establish a UE-to-network relay connection. Using a relatively simple two-hop relay connection between UE and a network device as an example, the conventional technology is to divide a link between a base station and UE into two links: a link between the base station and a relay station, and a link between the relay station and the UE, so that there is an opportunity to replace a poor-quality link with two high-quality links to obtain a larger link capacity and better coverage.

However, how to establish a UE-to-UE relay connection is an urgent problem to be resolved.

An embodiment of the present invention provides a relay connection establishment method. A network device may receive a relay connection service request message, authenticate and authorize a relay connection service based on the relay connection service request message, configure connection configuration parameters of the relay connection service, and send a relay connection service accept message; and a first direct communication connection between source UE and next-hop relay UE of the source UE is established, a first target direct communication connection between first UE and target relay UE is established, a second target direct communication connection between the target relay UE and second UE is established, and a second direct communication connection between target UE and previous-hop relay UE of the target UE is established for each directly connected UE in a relay connection from the source UE to the target UE, so that the relay connection from the source UE to the target UE can be established. In this way, communication quality of the connection established between the UEs can be improved.

The technical solutions provided by the present invention may be applied to various communications systems, for example, a 5G communications system, a future evolved system, or a converged communications system. A plurality of application scenarios may be included, for example, machine-to-machine (M2M), D2M, macro-micro communication, enhanced mobile Internet (enhanced Mobile Broadband, eMBB), ultra reliable and low latency communication (uRLLC), and massive machine-type communication (mMTC) scenarios. These scenarios include but are not limited to scenarios such as communication between UEs, communication between network devices, or communication between a network device and UE. Embodiments of the present invention may be applied to communication between a network device and UE, communication between UEs, or communication between network devices in a 5G communications system.

FIG. 1 is a possible schematic structural diagram of a communications system in an embodiment of the present invention. As shown in FIG. 1, the communications system includes at least one network device 100 (only one is illustrated in FIG. 1) and at least three UEs connected to each network device 100, and a UE-to-UE relay connection can be established between the at least three UEs. In FIG. 1, the at least three UEs being UE 101, UE 102, and UE 103 are used only as an example for description, where the UE 101 is source UE, the UE 102 is relay UE, and the UE 103 is target UE.

For example, the communications system shown in FIG. 1 may be a multi-carrier communications system, for example, a carrier aggregation (CA) scenario, or a dual connectivity (DC) scenario. This is not limited in this embodiment of the present invention.

The network device 100 may be a base station, a core network device, a transmission and reception point (TRP), a relay station, an access point, or the like. The network device 100 may be a base transceiver station (BTS) in a global system for mobile communications (GSM) or code division multiple access (CDMA) network, or may be an NB (NodeB) in wideband code division multiple access (WCDMA), or may be an eNB or eNodeB (evolved NodeB) in LTE. The network device 100 may alternatively be a radio controller in a cloud radio access network (CRAN) scenario. The network device 100 may alternatively be a network device in a 5G communications system or a network device in a future evolved network. However, the used terms do not constitute a limitation on the present invention.

For example, the network device 100 may include any one of the following: a policy control function (PCF), a network element function NEF), a unified data management (UDM) entity, or a unified data repository (UDR), or may be others. This is not limited in this embodiment of the present invention.

The UE 101 to UE 103 may be wireless UE or wired UE. The wireless UE may be a device providing voice and/or other service data connectivity for a user, a handheld device having a wireless communication function, a computing device, another processing device connected to a wireless modem, an in-vehicle device, a wearable device, UE in a future 5G network, UE in a future evolved PLMN network, or the like. The wireless UE may communicate with one or more core networks by using a radio access network (RAN). The wireless UE may be a mobile device, such as a mobile phone (also referred to as a "cellular" phone) and a computer that is provided with a mobile device, for example, may be a portable, pocket-sized, handheld, computer built-in, or in-vehicle mobile apparatus that exchanges voice and/or data with the radio access network, or a device such as a personal communication service (PCS) phone, a cordless telephone set, a session initiation protocol (SIP) phone, a wireless local loop (WLL) station, or a personal digital assistant (PDA). The wireless UE may also be a mobile device, a terminal device, an access terminal device, a wireless communications device, a terminal device unit, a terminal device station, a mobile station, a mobile, a remote station, a remote terminal device (Remote Terminal), a subscriber unit, a subscriber station, a user agent, or a terminal device apparatus. As an example, in this embodiment of the present invention, the UE 101 to UE 103 are shown as mobile phones in FIG. 1.

Currently, the conventional technology provides only a method about how to establish a UE-to-network relay connection; however, how to establish a UE-to-UE relay connection is an urgent problem to be resolved. To resolve this technical problem, embodiments of the present invention provide a relay connection establishment method and a device. The following describes in detail how to establish a UE-to-UE relay connection by using establishment of a relay connection from source UE to target UE as an example.

Figure 2:
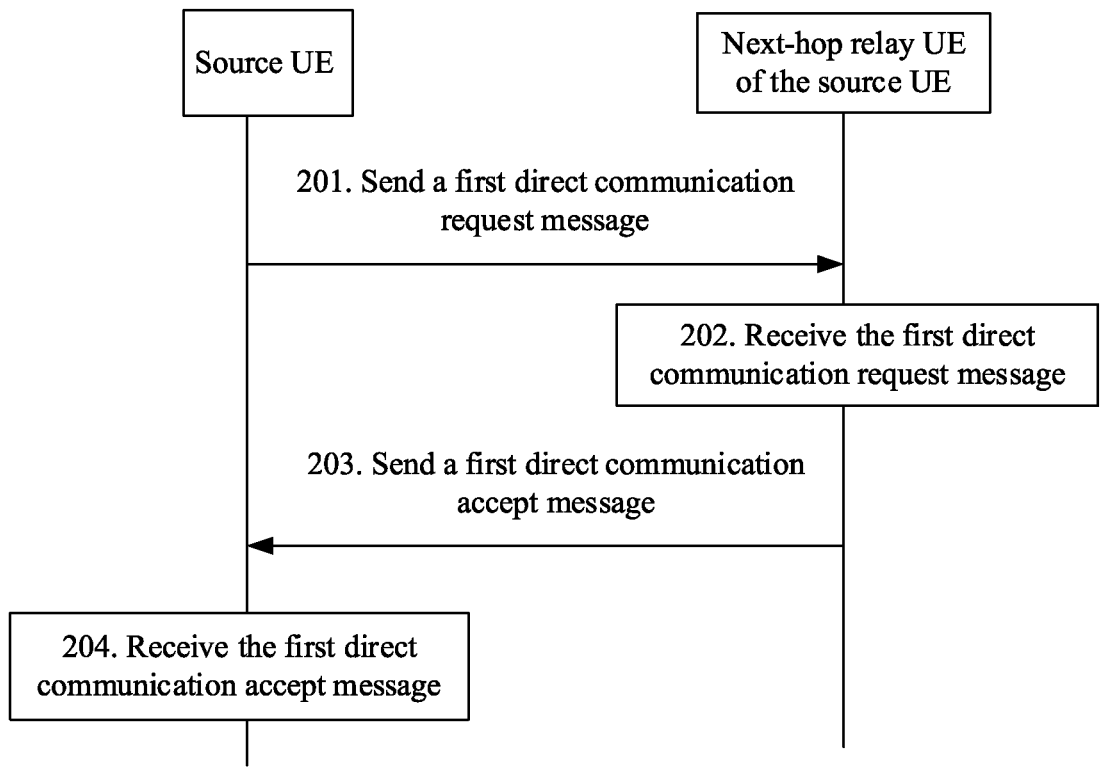
FIG. 2 is a first flowchart of a relay connection establishment method according to an embodiment of the present invention.

Based on the communications system shown in FIG. 1, as shown in FIG. 2, an embodiment of the present invention provides a relay connection establishment method. The method may include the following step 201 to step 204.

Step 201: Source UE sends a first direct communication request message to next-hop relay UE of the source UE.

Step 202: The next-hop relay UE of the source UE receives the first direct communication request message from the source UE.

The first direct communication request message is used to request to establish, in a process of establishing a relay connection from the source UE to target UE, a first direct communication connection between the source UE and the next-hop relay UE of the source UE.

In this embodiment of the present invention, the relay connection from the source UE to the target UE is a relay connection between the source UE, at least one relay UE, and the target UE. The source UE is originating UE in the relay connection. The next-hop relay UE of the source UE is relay UE directly connected to the source UE in the relay connection.

Optionally, the first direct communication connection may be a PC5 connection established between the source UE and the next-hop relay UE of the source UE through a PC5 interface.

Step 203: The next-hop relay UE of the source UE sends a first direct communication accept message to the source UE.

Step 204: The source UE receives the first direct communication accept message from the next-hop relay UE of the source UE.

The first direct communication accept message is used to indicate acceptance of the request for establishing the first direct communication connection in the process of establishing the relay connection.

Optionally, the first direct communication request message and the first direct communication accept message both carry an identifier of the source UE, an identifier of the next-hop relay UE of the source UE, and an identifier of the target UE.

In this embodiment of the present invention, the identifier of the source UE is used to uniquely indicate the source UE, and the identifier of the source UE may be any one of the following: an application layer identifier (Application layer ID) of the source UE, an international mobile subscriber identity (IMSI) of the source UE, and a permanent equipment identifier (PEI) of the source UE. The identifier of the source UE may also be other identifiers used to uniquely indicate the source UE. This is not limited in this embodiment of the present invention.

In this embodiment of the present invention, the identifier of the next-hop relay UE of the source UE is used to uniquely indicate the next-hop relay UE of the source UE, and the identifier of the next-hop relay UE of the source UE may be any one of the following: an application layer identifier of the next-hop relay UE of the source UE, an IMSI of the next-hop relay UE of the source UE, and a PEI of the next-hop relay UE of the source UE. The identifier of the next-hop relay UE of the source UE may also be other identifiers used to uniquely indicate the next-hop relay UE of the source UE. This is not limited in this embodiment of the present invention.

In this embodiment of the present invention, the identifier of the target UE is used to uniquely indicate the target UE, and the identifier of the target UE may be any one of the following: an application layer identifier of the target UE, an IMSI of the target UE, and a PEI of the target UE. The identifier of the target UE may also be other identifiers used to uniquely indicate the target UE. This is not limited in this embodiment of the present invention.

In this embodiment of the present invention, in the foregoing step 202, the next-hop relay UE of the source UE receives the first direct communication request message from the source UE based on the identifier of the next-hop relay UE of the source UE. In the foregoing step 204, the source UE receives the first direct communication accept message from the next-hop relay UE of the source UE based on the identifier of the source UE.

It should be noted that, in this embodiment of the present invention, in a case in which the relay connection includes a plurality of relay UEs, the first direct communication request message and the first direct communication accept message may further carry identifiers of other relay UEs than previous-hop relay UE of the target UE. This may be specifically determined based on an actual usage requirement, and is not limited in this embodiment of the present invention.

In this embodiment of the present invention, the first direct communication request message carries the identifier of the source UE, the identifier of the next-hop relay UE of the source UE, and the identifier of the target UE, so that the next-hop relay UE of the source UE can conveniently learn, based on the identifier of the next-hop relay UE of the source UE and the identifier of the source UE, that the first direct communication request message is sent by the source UE to the next-hop relay UE of the source UE, and learn, based on the identifier of the source UE and the identifier of the target UE, that the UE-to-UE relay connection is the relay connection from the source UE to the target UE, and therefore, can learn next-hop UE of the next-hop relay UE of the source UE (based on routing information of the relay connection from the source UE to the target UE or connection configuration parameters configured by the network device for the relay connection, or the like).

In this embodiment of the present invention, the first direct communication accept message carries the identifier of the source UE, the identifier of the next-hop relay UE of the source UE, and the identifier of the target UE, so that the source UE can learn, based on the identifier of the source UE and the identifier of the next-hop relay UE of the source UE, that the first direct communication accept message is sent by the source UE to the next-hop relay UE of the source UE, and learn, based on the identifier of the source UE and the identifier of the target UE, that the UE-to-UE relay connection is the relay connection from the source UE to the target UE.

Optionally, the foregoing step 201 may be specifically implemented by using the following step 201*a*.

Step 201*a*: The source UE sends the first direct communication request message to the next-hop relay UE of the source UE based on a first connection configuration parameter.

The first connection configuration parameter is used for establishing the first direct communication connection in the process of establishing the relay connection.

In this embodiment of the present invention, the first connection configuration parameter is a configuration parameter configured by the network device for the source UE to establish the first direct communication connection to the next-hop relay UE of the source UE, such as a quality of service (Quality of Service, QoS) parameter on a PC5 interface (PC5 QoS parameter for short hereinafter) of the UE or a QoS rule on the PC5 interface (PC5 QoS rule for short hereinafter). For specific content of the PC5 QoS parameter and the PC5 QoS rule, reference may be made to the description of any related art. Details are not described herein again.

Optionally, before the foregoing step 201*a*, the source UE needs to first receive the first connection configuration parameter from the network device.

For example, before the foregoing step 201*a*, the relay connection establishment method provided in this embodiment of the present invention may further include the following step 205 and step 206.

Step 205: The network device sends the first connection configuration parameter to the source UE.

Step 206: The source UE receives the first connection configuration parameter from the network device.

Optionally, the network device sends a first non-access stratum (NAS) message to the source UE, and the source UE receives the first NAS message from the network device. The first NAS message carries the first connection configuration parameter.

Optionally, the first connection configuration parameter may be actively sent by the network device to the source UE, or may be sent by the network device on request of the source UE.

For example, before the foregoing step 205, the relay connection establishment method provided in this embodiment of the present invention may further include the following step 207 and step 208.

Step 207: The source UE sends a first configuration request message to the network device.

Step 208: The network device receives the first configuration request message from the source UE.

The first configuration request message is used to request the network device to configure the first connection configuration parameter for the source UE.

Optionally, the first configuration request message may be a second NAS message.

Optionally, the first configuration request message may carry the identifier of the source UE, the identifier of the next-hop relay UE of the source UE, and the identifier of the target UE.

In the relay connection establishment method provided in this embodiment of the present invention, the source UE may send the first direct communication request message to the next-hop relay UE of the source UE, and receive the first direct communication accept message from the next-hop relay UE of the source UE, where the first direct communication request message is used to request to establish, in the process of establishing the relay connection from the source UE to the target UE, the first direct communication connection between the source UE and the next-hop relay UE of the source UE; and the first direct communication accept message is used to indicate acceptance of the request for establishing the first direct communication connection in the process of establishing the relay connection. In this solution, the first direct communication connection between the source UE and the next-hop relay UE of the source UE is established, so that the relay connection from the source UE to the target UE can be established. In this way, communication quality of the connection established between the UEs can be improved.

Figure 3:
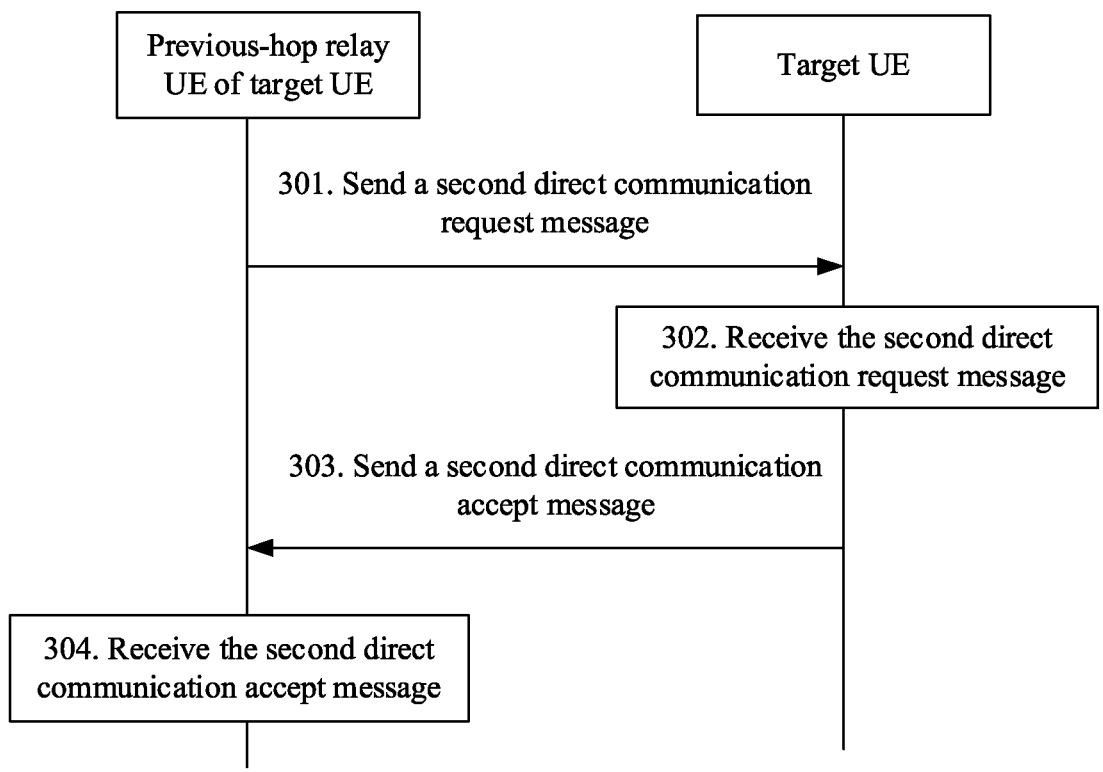
FIG. 3 is a second flowchart of a relay connection establishment method according to an embodiment of the present invention.

Based on the communications system shown in FIG. 1, as shown in FIG. 3, an embodiment of the present invention provides a relay connection establishment method. The method may include the following step 301 to step 304.

Step 301: Previous-hop relay UE of target UE sends a second direct communication request message to the target UE.

Step 302: The target UE receives the second direct communication request message from the previous-hop relay UE of the target UE.

The second direct communication request message is used to request to establish, in a process of establishing a relay connection from source UE to the target UE, a second direct communication connection between the target UE and the previous-hop relay UE of the target UE.

In this embodiment of the present invention, the relay connection from the source UE to the target UE is a relay connection between the source UE, at least one relay UE, and the target UE. The target UE is target UE in the relay connection; and the previous-hop relay UE of the target UE is relay UE directly connected to the target UE in the relay connection.

Optionally, the second direct communication connection may be a PC5 connection established between the target UE and the previous-hop relay UE of the target UE through a PC5 interface.

Step 303: The target UE sends a second direct communication accept message to the previous-hop relay UE of the target UE.

Step 304: The previous-hop relay UE of the target UE receives the second direct communication accept message from the target UE.

The second direct communication accept message is used to indicate acceptance of the request for establishing the second direct communication connection in the process of establishing the relay connection.

Optionally, the second direct communication request message and the second direct communication accept message both carry an identifier of the source UE, an identifier of the previous-hop relay UE of the target UE, and an identifier of the target UE.

In this embodiment of the present invention, the identifier of the previous-hop relay UE of the target UE is used to uniquely indicate the previous-hop relay UE of the target UE, and the identifier of the previous-hop relay UE of the target UE may be any one of the following: an application layer identifier of the previous-hop relay UE of the target UE, an IMSI of the previous-hop relay UE of the target UE, and a PEI of the previous-hop relay UE of the target UE. The identifier of the previous-hop relay UE of the target UE may also be other identifiers used to uniquely indicate the previous-hop relay UE of the target UE. This is not limited in this embodiment of the present invention.

In this embodiment of the present invention, for the description of the identifier of the source UE and the identifier of the target UE, reference may be made to the related description in the foregoing embodiment. Details are not described herein again.

In this embodiment of the present invention, in the foregoing step 302, the target UE receives the second direct communication request message from the previous-hop relay UE of the target UE based on the identifier of the target UE. In the foregoing step 304, the previous-hop relay UE of the target UE receives the second direct communication accept message from the target UE based on the identifier of the previous-hop relay UE of the target UE.

It should be noted that, in this embodiment of the present invention, in a case in which the relay connection includes a plurality of relay UEs, the second direct communication request message and the second direct communication accept message may further carry identifiers of other relay UEs than the previous-hop relay UE of the target UE. This may be specifically determined based on an actual usage requirement, and is not limited in this embodiment of the present invention.

In this embodiment of the present invention, in the foregoing step 302, the target UE receives the second direct communication request message from the previous-hop relay UE of the target UE based on the identifier of the target UE. In the foregoing step 304, the previous-hop relay UE of the target UE receives the second direct communication accept message from the target UE based on the identifier of the previous-hop relay UE of the target UE.

In this embodiment of the present invention, the second direct communication request message carries the identifier of the source UE, the identifier of the previous-hop relay UE of the target UE, and the identifier of the target UE, so that the target UE can learn, based on the identifier of the previous-hop relay UE of the target UE and the identifier of the target UE, that the second direct communication request message is sent by the previous-hop relay UE of the target UE to the target UE, and learn, based on the identifier of the source UE and the identifier of the target UE, that the UE-to-UE relay connection is the relay connection from the source UE to the target UE.

In this embodiment of the present invention, the second direct communication accept message carries the identifier of the source UE, the identifier of the previous-hop relay UE of the target UE, and the identifier of the target UE, so that the previous-hop relay UE of the target UE can conveniently learn, based on the identifier of the previous-hop relay UE of the target UE and the identifier of the target UE, that the second direct communication accept message is sent by the target UE to the previous-hop relay UE of the target UE, and learn, based on the identifier of the source UE and the identifier of the target UE, that the UE-to-UE relay connection is the relay connection from the source UE to the target UE, and therefore, can learn previous-hop UE of the previous-hop relay UE of the target UE (based on routing information of the relay connection from the source UE to the target UE or connection configuration parameters configured by a network device for the relay connection, or the like).

Optionally, the foregoing step 303 may be specifically implemented by using the following step 303a.

Step 303a: The target UE sends the second direct communication accept message to the previous-hop relay UE of the target UE based on a second connection configuration parameter.

The second connection configuration parameter is used for establishing the second direct communication connection in the process of establishing the relay connection.

In this embodiment of the present invention, the second connection configuration parameter is a configuration parameter configured by the network device for the target UE to establish the second direct communication connection to the previous-hop relay UE of the target UE, such as a PC5 QoS parameter or a PC5 QoS rule.

Optionally, before the foregoing step 303a, the target UE needs to first receive the second connection configuration parameter from the network device.

For example, before the foregoing step 303a, the relay connection establishment method provided in this embodiment of the present invention may further include the following step 305 and step 306.

Step 305: The network device sends the second connection configuration parameter to the target UE.

Step 306: The target UE receives the second connection configuration parameter from the network device.

Optionally, the network device sends a third NAS message to the target UE, and the target UE receives the third NAS message from the network device. The third NAS message carries the second connection configuration parameter.

Optionally, the second connection configuration parameter may be actively sent by the network device to the target UE, or may be sent by the network device on request of the target UE.

For example, before the foregoing step 305, the relay connection establishment method provided in this embodiment of the present invention may further include the following step 307 and step 308.

Step 307: The target UE sends a second configuration request message to the network device.

Step 308: The network device receives the second configuration request message from the target UE.

The second configuration request message is used to request the network device to configure the second connection configuration parameter for the target UE.

Optionally, the second configuration request message may be a fourth NAS message.

Optionally, the second configuration request message may carry the identifier of the source UE, the identifier of the previous-hop relay UE of the target UE, and the identifier of the target UE.

In the relay connection establishment method provided in this embodiment of the present invention, the target UE may receive the second direct communication request message from the previous-hop relay UE of the target UE, and send the second direct communication accept message to the previous-hop relay UE of the target UE, where the second direct communication request message is used to request to establish, in the process of establishing the relay connection from the source UE to the target UE, the second direct communication connection between the target UE and the previous-hop relay UE of the target UE; and the second direct communication accept message is used to indicate acceptance of the request for establishing the second direct communication connection in the process of establishing the relay connection. In this solution, the second direct communication connection between the target UE and the previous-hop relay UE of the target UE is established, so that the relay connection from the source UE to the target UE can be established. In this way, communication quality of the connection established between the UEs can be improved.

Figure 4:
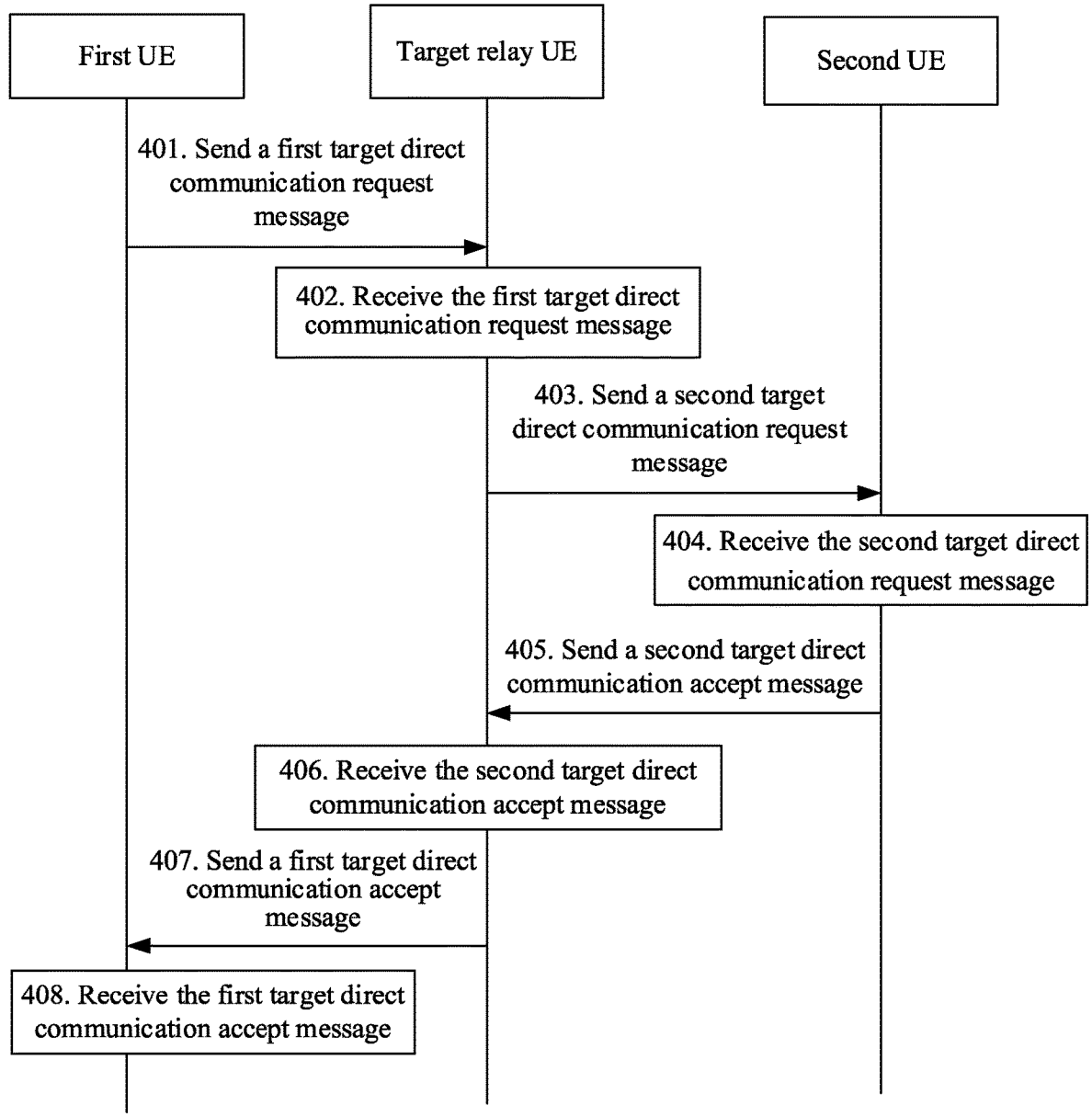
FIG. 4 is a third flowchart of a relay connection establishment method according to an embodiment of the present invention.

Based on the communications system shown in FIG. 1, as shown in FIG. 4, an embodiment of the present invention provides a relay connection establishment method. The method may include the following step 401 to step 408.

Step 401: First UE sends a first target direct communication request message to target relay UE.

Step 402: The target relay UE receives the first target direct communication request message from the first UE.

The first UE is source UE or previous-hop relay UE of the target relay UE, and the first target direct communication request message is used to request to establish, in a process of establishing a relay connection from the source UE to target UE, a first target direct communication connection between the first UE and the target relay UE.

In this embodiment of the present invention, the relay connection from the source UE to the target UE is a relay connection between the source UE, at least one relay UE, and the target UE. The target relay UE is any one of the at least one UE, and the first UE is previous-hop UE directly connected to the target relay UE.

Optionally, the first target direct communication connection may be a PC5 connection established between the target relay UE and the first UE through a PC5 interface.

Step 403: The target relay UE sends a second target direct communication request message to second UE.

Step 404: The second UE receives the second target direct communication request message from the target relay UE.

The second UE is the target UE or next-hop relay UE of the target relay UE, and the second target direct communication request message is used to request to establish, in the process of establishing the relay connection, a second target direct communication connection between the target relay UE and the second UE.

In this embodiment of the present invention, the second UE is next-hop UE directly connected to the target relay UE.

Optionally, the second target direct communication connection may be a PC5 connection established between the target relay UE and the second UE through a PC5 interface.

Step 405: The second UE sends a second target direct communication accept message to the target relay UE.

Step 406: The target relay UE receives the second target direct communication accept message from the second UE.

The second target direct communication accept message is used to indicate acceptance of the request for establishing the second target direct communication connection in the process of establishing the relay connection.

Step 407: The target relay UE sends a first target direct communication accept message to the first UE.

Step 408: The first UE receives the first target direct communication accept message from the target relay UE.

The first target direct communication accept message is used to indicate acceptance of the request for establishing, in the process of establishing the relay connection, the first target direct communication connection.

Optionally, in a case in which the first UE is the source UE, the first target direct communication request message and the first target direct communication accept message both carry an identifier of the source UE, an identifier of the target relay UE, and an identifier of the target UE.

It should be noted that, in this embodiment of the present invention, in a case in which the relay connection includes a plurality of relay UEs, the first target direct communication request message and the first target direct communication accept message may further carry identifiers of other relay UEs than the target relay UE. This may be specifically determined based on an actual usage requirement, and is not limited in this embodiment of the present invention.

In this embodiment of the present invention, the first target direct communication request message carries the identifier of the source UE, the identifier of the target relay UE, and the identifier of the target UE. Therefore, the target relay UE can conveniently learn, based on the identifier of the target relay UE and the identifier of the source UE, that the first target direct communication request message is sent by the source UE to the target relay UE, and learn, based on the identifier of the source UE and the identifier of the target UE, that the UE-to-UE relay connection is the relay connection from the source UE to the target UE, and therefore, can learn next-hop UE of the target relay UE (based on routing information of the relay connection from the source UE to the target UE or connection configuration parameters configured by a network device for the relay connection, or the like).

In this embodiment of the present invention, the first target direct communication accept message carries the identifier of the source UE, the identifier of the target relay UE, and the identifier of the target UE. Therefore, the source UE can conveniently learn, based on the identifier of the target relay UE and the identifier of the source UE, that the first target direct communication accept message is sent by the target relay UE to the source UE, and learn, based on the identifier of the source UE and the identifier of the target UE, that the UE-to-UE relay connection is the relay connection from the source UE to the target UE.

Optionally, in a case in which the first UE is the previous-hop relay UE of the target relay UE, the first target direct communication request message and the first target direct communication accept message both carry an identifier of the source UE, an identifier of the first UE, an identifier of the target relay UE, and an identifier of the target UE.

It should be noted that, in this embodiment of the present invention, in a case in which the relay connection includes a plurality of relay UEs, the first target direct communication request message and the first target direct communication accept message may further carry identifiers of other relay UEs than the target relay UE and the first UE. This may be specifically determined based on an actual usage requirement, and is not limited in this embodiment of the present invention.

In this embodiment of the present invention, the first target direct communication request message carries the identifier of the source UE, the identifier of the first UE, the identifier of the target relay UE, and the identifier of the target UE. Therefore, the target relay UE can conveniently learn, based on the identifier of the target relay UE and the identifier of the first UE, that the first target direct communication request message is sent by the first UE to the target relay UE, and learn, based on the identifier of the source UE and the identifier of the target UE, that the UE-to-UE relay connection is the relay connection from the source UE to the target UE, and therefore, can learn next-hop UE of the target relay UE (based on routing information of the relay connection from the source UE to the target UE or connection configuration parameters configured by the network device for the relay connection, or the like).

In this embodiment of the present invention, the first target direct communication accept message carries the identifier of the source UE, the identifier of the first UE, the identifier of the target relay UE, and the identifier of the target UE. Therefore, the first UE can conveniently learn, based on the identifier of the first UE and the identifier of the target relay UE, that the first target direct communication accept message is sent by the target relay UE to the first UE, and learn, based on the identifier of the source UE and the identifier of the target UE, that the UE-to-UE relay connection is the relay connection from the source UE to the target UE, and therefore, can learn previous-hop UE of the first UE (based on routing information of the relay connection from the source UE to the target UE or connection configuration parameters configured by the network device for the relay connection, or the like).

Optionally, in a case in which the second UE is the target UE, the second target direct communication request message and the second target direct communication accept message both carry an identifier of the source UE, an identifier of the target relay UE, and an identifier of the target UE.

It should be noted that, in this embodiment of the present invention, in a case in which the relay connection includes a plurality of relay UEs, the second target direct communication request message and the second target direct communication accept message may further carry identifiers of other relay UEs than the target relay UE. This may be specifically determined based on an actual usage requirement, and is not limited in this embodiment of the present invention.

In this embodiment of the present invention, the second target direct communication request message carries the identifier of the source UE, the identifier of the target relay UE, and the identifier of the target UE. Therefore, the target UE can conveniently learn, based on the identifier of the target UE and the identifier of the target relay UE, that the second target direct communication request message is sent by the target relay UE to the target UE, and learn, based on the identifier of the source UE and the identifier of the target UE, that the UE-to-UE relay connection is the relay connection from the source UE to the target UE.

In this embodiment of the present invention, the second target direct communication accept message carries the identifier of the source UE, the identifier of the target relay UE, and the identifier of the target UE. Therefore, the target relay UE can conveniently learn, based on the identifier of the target relay UE and the identifier of the target UE, that the second target direct communication accept message is sent by the target UE to the target relay UE, and learn, based on the identifier of the source UE and the identifier of the target UE, that the UE-to-UE relay connection is the relay connection from the source UE to the target UE, and therefore, can learn previous-hop UE of the target relay UE (based on routing information of the relay connection from the source UE to the target UE or connection configuration parameters configured by the network device for the relay connection, or the like).

Optionally, in a case in which the second UE is the next-hop relay UE of the target relay UE, the second target direct communication request message and the second target direct communication accept message both carry an identifier of the source UE, an identifier of the target relay UE, an identifier of the second UE, and an identifier of the target UE.

It should be noted that, in this embodiment of the present invention, in a case in which the relay connection includes a plurality of relay UEs, the second target direct communication request message and the second target direct communication accept message may further carry identifiers of other relay UEs than the target relay UE and the second UE. This may be specifically determined based on an actual usage requirement, and is not limited in this embodiment of the present invention.

In this embodiment of the present invention, the second target direct communication request message carries the identifier of the source UE, the identifier of the target relay UE, the identifier of the second UE, and the identifier of the target UE. Therefore, the second UE can conveniently learn, based on the identifier of the target relay UE and the identifier of the second UE, that the second target direct communication request message is sent by the target relay UE to the second UE, and learn, based on the identifier of the source UE and the identifier of the target UE, that the UE-to-UE relay connection is the relay connection from the source UE to the target UE, and therefore, can learn next-hop UE of the second UE (based on routing information of the relay connection from the source UE to the target UE or connection configuration parameters configured by the network device for the relay connection, or the like).

In this embodiment of the present invention, the second target direct communication accept message carries the identifier of the source UE, the identifier of the target relay UE, the identifier of the second UE, and the identifier of the target UE. Therefore, the target relay UE can conveniently learn, based on the identifier of the target relay UE and the identifier of the second UE, that the second target direct communication accept message is sent by the second UE to the target relay UE, and learn, based on the identifier of the source UE and the identifier of the target UE, that the UE-to-UE relay connection is the relay connection from the source UE to the target UE, and therefore, can learn previous-hop UE of the target relay UE (based on routing information of the relay connection from the source UE to the target UE or connection configuration parameters configured by the network device for the relay connection, or the like).

In this embodiment of the present invention, the identifier of the target relay UE is used to uniquely indicate the target relay UE, and the identifier of the target relay UE may be any one of the following: an application layer identifier of the target relay UE, an IMSI of the target relay UE, and a PEI of the target relay UE. The identifier of the target relay UE may also be other identifiers used to uniquely indicate the target relay UE. This is not limited in this embodiment of the present invention.

In this embodiment of the present invention, the identifier of the first UE is used to uniquely indicate the first UE, and the identifier of the first UE may be any one of the following: an application layer identifier of the first UE, an IMSI of the first UE, and a PEI of the first UE. The identifier of the first UE may also be other identifiers used to uniquely indicate the first UE. This is not limited in this embodiment of the present invention.

In this embodiment of the present invention, the identifier of the second UE is used to uniquely indicate the second UE, and the identifier of the second UE may be any one of the following: an application layer identifier of the second UE, an IMSI of the second UE, and a PEI of the second UE. The identifier of the second UE may also be other identifiers used to uniquely indicate the second UE. This is not limited in this embodiment of the present invention.

In this embodiment of the present invention, for the description of the identifier of the source UE and the identifier of the target UE, reference may be made to the related description in the foregoing embodiment. Details are not described herein again.

It may be understood that in a case in which the first UE is the source UE, the target relay UE is the next-hop relay UE of the source UE in step 201 in the foregoing embodiment, the first target direct communication request message is the first direct communication request message in step 201 in the foregoing embodiment, and the first target direct communication accept message is the first direct communication accept message in step 203 in the foregoing embodiment.

It may be understood that in a case in which the second UE is the target UE, the target relay UE is the previous-hop relay UE of the target UE in step 301 in the foregoing embodiment, the second target direct communication request message is the second direct communication request message in step 301 in the foregoing embodiment, and the second target direct communication accept message is the second direct communication accept message in step 303 in the foregoing embodiment.

In this embodiment of the present invention, in the foregoing step 402, the target relay UE receives the first target direct communication request message from the first UE based on the identifier of the target relay UE. In the foregoing step 404, the second UE receives the second target direct communication request message from the target relay UE based on the identifier of the second UE. In the foregoing step 406, the target relay UE receives the second target direct communication accept message from the second UE based on the identifier of the target relay UE. In the foregoing step 408, the first UE receives the first target direct communication accept message from the target relay UE based on the identifier of the first UE.

Optionally, the foregoing step 403 may be specifically implemented by using the following step 403a.

Step 403a: The target relay UE sends the second target direct communication request message to the second UE based on a target connection configuration parameter.

The target connection configuration parameter is used for establishing the first target direct communication connection and the second target direct communication connection in the process of establishing the relay connection.

In this embodiment of the present invention, the target connection configuration parameter is a configuration parameter configured by the network device for the target relay UE to establish the first target direct communication connection to the first UE and establish the second target direct communication connection to the second UE, such as a PC5 QoS parameter or a PC5 QoS rule.

Optionally, before the foregoing step 403a, the target relay UE needs to first receive the target connection configuration parameter from the network device.

For example, before the foregoing step 403a, the relay connection establishment method provided in this embodiment of the present invention may further include the following step 409 and step 410.

Step 409: The network device sends the target connection configuration parameter to the target relay UE.

Step 410: The target relay UE receives the target connection configuration parameter from the network device.

Optionally, the network device sends a fifth NAS message to the target relay UE, and the target relay UE receives the fifth NAS message from the network device. The fifth NAS message carries the target connection configuration parameter.

Optionally, the target connection configuration parameter may be actively sent by the network device to the target relay UE, or may be sent by the network device on request of the target relay UE.

For example, before the foregoing step 409, the relay connection establishment method provided in this embodiment of the present invention may further include the following step 411 and step 412.

Step 411: The target relay UE sends a target configuration request message to the network device.

Step 412: The network device receives the target configuration request message from the target relay UE.

The target configuration request message is used to request the network device to configure the target connection configuration parameter for the target relay UE.

Optionally, the target configuration request message may be a sixth NAS message.

Optionally, in a case in which the first UE is the source UE, the target configuration request message may carry an identifier of the source UE, an identifier of the target relay UE, and an identifier of the target UE.

Optionally, in a case in which the first UE is the previous-hop relay UE of the target relay UE, the target configuration request message may carry an identifier of the source UE, an identifier of the first UE, an identifier of the target relay UE, and an identifier of the target UE.

Optionally, in a case in which the second UE is the target UE, the target configuration request message may carry an identifier of the source UE, an identifier of the target relay UE, and an identifier of the target UE.

Optionally, in a case in which the second UE is the next-hop relay UE of the target relay UE, the target configuration request message may carry an identifier of the source UE, an identifier of the target relay UE, an identifier of the second UE, and an identifier of the target UE.

In the relay connection establishment method provided in this embodiment of the present invention, the target relay UE may receive the first target direct communication request message from the first UE, send the second target direct communication request message to the second UE, receive the second target direct communication accept message from the second UE, and send the first target direct communication accept message to the first UE, where the first UE is the source UE or the previous-hop relay UE of the target relay UE, and the first target direct communication request message is used to request to establish, in the process of establishing the relay connection from the source UE to the target UE, the first target direct communication connection between the first UE and the target relay UE; the second UE is the target UE or the next-hop relay UE of the target relay UE, and the second target direct communication request message is used to request to establish, in the process of establishing the relay connection, the second target direct communication connection between the target relay UE and the second UE; the second target direct communication accept message is used to indicate acceptance of the request for establishing the second target direct communication connection in the process of establishing the relay connection; and the first target direct communication accept message is used to indicate acceptance of the request for establishing, in the process of establishing the relay connection, the first target direct communication connection. In this solution, the first target direct communication connection between the first UE and the target relay UE is established, and the second target direct communication connection between the target relay UE and the second UE is established, so that the relay connection from the source UE to the target UE can be established. In this way, communication quality of the connection established between the UEs can be improved.

Figure 5:
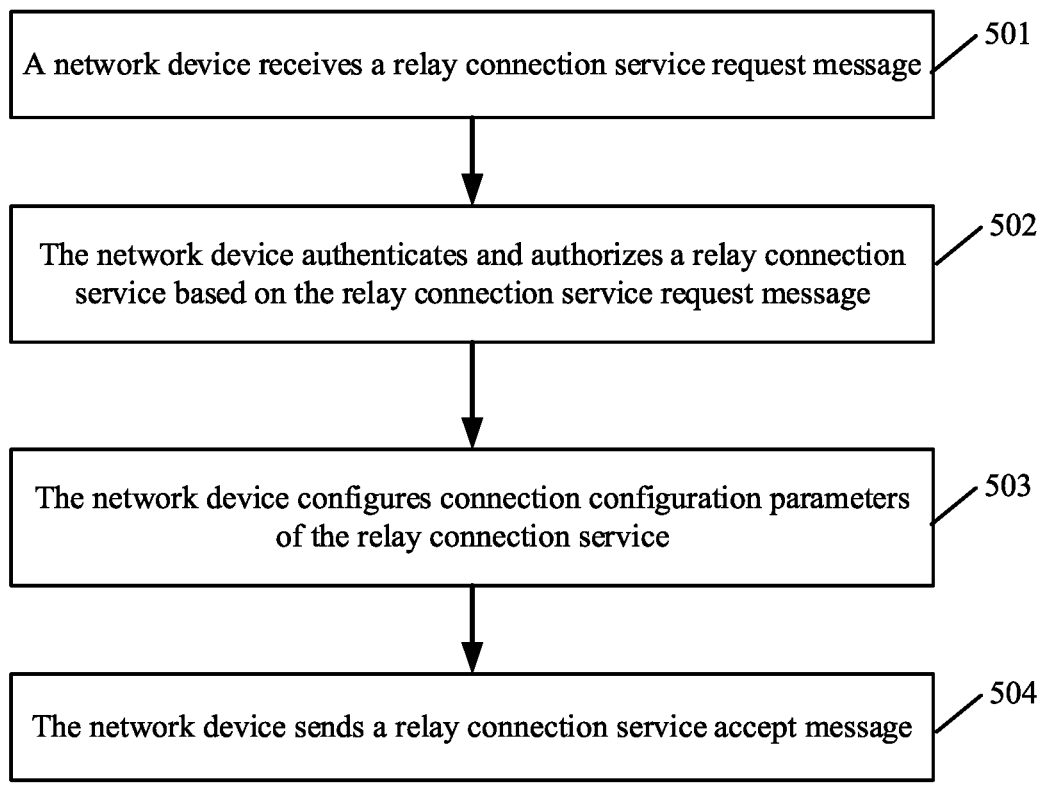
FIG. 5 is a fourth flowchart of a relay connection establishment method according to an embodiment of the present invention.

Based on the communications system shown in FIG. 1, as shown in FIG. 5, an embodiment of the present invention provides a relay connection establishment method, applied to a network device. The method may include the following step 501 to step 504.

Step 501: The network device receives a relay connection service request message.

The relay connection service request message is used to request a relay connection service of a relay connection from source UE to target UE.

Optionally, the network device may receive the relay connection service request message from an application server (AS), a proximity services function (ProSe Fun, PF), or an application function (AF), or the like.

The AS, PF, AF, or the like obtains a proximity topology map between UEs through GPS positioning, a proximity discovery process between UEs, or other positioning functions, or determines a proximity topology map between UEs by using a current PC5 connection status between UEs. Then the AS, PF, AF, or the like generates a requirement for a relay connection service of the relay connection from the source UE to the target UE based on a service requirement.

The AS, PF, AF, or the like sends the relay connection service request message to the network device.

Optionally, the relay connection service request message carries an identifier of the source UE, an identifier of each relay UE, an identifier of the target UE, requirement information of the relay connection service, and routing information of the relay connection service.

In this embodiment of the present invention, the identifier of each relay UE is used to uniquely indicate the corresponding relay UE, and the identifier of each relay UE may include at least one of the following: an application layer identifier of the corresponding relay UE, an IMSI of the corresponding relay UE, and a PEI of the corresponding relay UE. The identifier of each relay UE may also be other identifiers used to uniquely indicate the corresponding relay UE. This is not limited in this embodiment of the present invention.

In this embodiment of the present invention, for the description of the identifier of the source UE and the identifier of the target UE, reference may be made to the related description in the foregoing embodiment. Details are not described herein again.

In this embodiment of the present invention, the relay connection service request message carries an identifier of the source UE, an identifier of each relay UE, an identifier of the target UE, requirement information of the relay connection service, and routing information of the relay connection service. Therefore, the network device can conveniently learn that the UE-to-UE relay connection is specifically a connection between the source UE, each relay UE, and the target UE.

In this embodiment of the present invention, the requirement information may be QoS requirement information of the relay connection service.

In this embodiment of the present invention, the routing information is used to indicate a route of the relay connection.

Optionally, the routing information is a routing table from the source UE to the target UE in the relay connection.

Step 502: The network device authenticates and authorizes the relay connection service based on the relay connection service request message.

Optionally, in this embodiment of the present invention, the network device authenticates and authorizes the relay connection service request by retrieving UE subscription information, local network information, and the like in the relay connection service. For example, an NEF authenticates and authorizes the relay connection service request.

Step 503: The network device configures connection configuration parameters of the relay connection service.

The connection configuration parameters include a first connection configuration parameter, a target connection configuration parameter of each relay UE, and a second connection configuration parameter.

The first connection configuration parameter is used for establishing a first direct communication connection between the source UE and next-hop relay UE of the source UE in a process of establishing the relay connection; the target connection configuration parameter is used for establishing a first target direct communication connection between corresponding relay UE and first UE and establishing a second target direct communication connection between the corresponding relay UE and second UE in the process of establishing the relay connection, where the first UE is the source UE or previous-hop relay UE of the corresponding relay UE, and the second UE is the target UE or next-hop relay UE of the corresponding relay UE; and the second connection configuration parameter is used for establishing a second direct communication connection between the target UE and previous-hop relay UE of the target UE in the process of establishing the relay connection.

In this embodiment of the present invention, the first connection configuration parameter is the first connection configuration parameter described in step 201*a* in the foregoing embodiment. The second connection configuration parameter is the second connection configuration parameter described in step 203*a* in the foregoing embodiment. The target connection configuration parameter is the target connection configuration parameter described in step 403*a* in the foregoing embodiment.

In this embodiment of the present invention, the network device creates a connection configuration parameter of the relay connection through a PCF based on the relay connection service request message and subscription information in a UDM.

Step 504: The network device sends a relay connection service accept message.

The relay connection service accept message is used to indicate acceptance of the relay connection service request.

After receiving the relay connection service accept message sent by the network device, the AS, PF, AF, or the like can send the routing information of the relay connection to the source UE, each relay UE, and the target UE separately by using application layer messages. After receiving the routing information sent by the AS, PF, AF, or the like, the source UE, each relay UE, and the target UE in the relay connection can learn the routing information of the relay connection that needs to be established.

For example, the source UE included in the relay connection is UE 1, the target UE is UE 2, and the relay UEs are UE 3 and UE 4. A connection relationship of the relay connection is: UE 1 connected to UE 3 connected to UE 4 connected to UE 2; and the routing information is UE 1→UE 3→UE 4→UE 2.

Optionally, before the foregoing step 503, the network device may further authorize each relay UE in the relay connection.

For example, before the foregoing step 503, the relay connection establishment method provided in this embodiment of the present invention may further include the following step 505.

Step 505: The network device authorizes each relay UE in the routing information based on the relay connection service request message and UE subscription information.

The UE subscription information may be the subscription information in the UDM.

It should be noted that in this embodiment of the present invention, an execution order of step 503 and step 505 is not limited. For example, step 503 may be performed before step 505; or step 505 may be performed before step 503; or step 503 and step 505 may be performed simultaneously.

Optionally, after the foregoing step 504, the network device sends a corresponding connection configuration parameter to each UE in the relay connection.

For example, after the foregoing step 504, the relay connection establishment method provided in this embodiment of the present invention may further include the following step 506 to step 508.

Step 506: The network device sends the first connection configuration parameter to the source UE.

For the description of step 506, reference may be made to the related description of the foregoing step 205. Details are not described herein again.

Step 507: The network device sends the corresponding target connection configuration parameter to each relay UE.

For the description of step 507, reference may be made to the related description of the foregoing step 409. Details are not described herein again.

Step 508: The network device sends the second connection configuration parameter to the target UE.

For the description of step 508, reference may be made to the related description of the foregoing step 305. Details are not described herein again.

Optionally, the network device may actively send the corresponding connection configuration parameter to each UE in the relay connection, or may send the corresponding connection configuration parameter based on the configuration request message of each UE.

For example, before the foregoing step 506, the relay connection establishment method provided in this embodiment of the present invention may further include the following step 509; before the foregoing step 507, the relay connection establishment method provided in this embodiment of the present invention may further include the following step 510; and before the foregoing step 508, the relay connection establishment method provided in this embodiment of the present invention may further include the following step 511.

Step 509: The network device receives a first configuration request message from the source UE.

The first configuration request message is used to request the network device to configure the first connection configuration parameter for the source UE.

For the description of step 509, reference may be made to the related description of the foregoing step 208. Details are not described herein again.

Step 510: The network device receives a corresponding target configuration request message from each relay UE.

The target configuration request message is used to request the network device to configure the target connection configuration parameter for the corresponding relay UE.

For the description of step 510, reference may be made to the related description of the foregoing step 412. Details are not described herein again.

Step 511: The network device receives a second configuration request message from the target UE.

The second configuration request message is used to request the network device to configure the second connection configuration parameter for the target UE.

For the description of step 511, reference may be made to the related description of the foregoing step 308. Details are not described herein again.

In the relay connection establishment method provided in this embodiment of the present invention, the network device may receive the relay connection service request message, authenticate and authorize the relay connection service based on the relay connection service request message, configure the connection configuration parameters of the relay connection service, and send the relay connection service accept message, where the relay connection service request message is used to request the relay connection service of the relay connection from the source UE to the target UE; the connection configuration parameters include the first connection configuration parameter, the target connection configuration parameter of each relay UE, and the second connection configuration parameter; and the relay connection service accept message is used to indicate acceptance of the relay connection service request, where the first connection configuration parameter is used for establishing the first direct communication connection between the source UE and the next-hop relay UE of the source UE in the process of establishing the relay connection; the target connection configuration parameter is used for establishing the first target direct communication connection between the corresponding relay UE and the first UE and establishing the second target direct communication connection between the corresponding relay UE and the second UE in the process of establishing the relay connection, where the first UE is the source UE or the previous-hop relay UE of the corresponding relay UE, and the second UE is the target UE or the next-hop relay UE of the corresponding relay UE; and the second connection configuration parameter is used for establishing the second direct communication connection between the target UE and the previous-hop relay UE of the target UE in the process of establishing the relay connection. In this solution, the relay connection from the source UE to the target UE can be established. In this way, communication quality of the connection established between the UEs can be improved.

With reference to the foregoing embodiment, the following is an exemplary description of a process of establishing a relay connection based on an assumption that a relay connection from source UE to target UE includes one relay UE.

The relay connection from the source UE to the target UE includes one relay UE (denoted to as first relay UE), and routing information is source UE→first relay UE→target UE. In this case, the first relay UE is target relay UE (that is, next-hop relay UE of the source UE, that is, previous-hop relay UE of the target UE), a first target direct communication request message is a first direct communication request message, a first target direct communication accept message is a first direct communication accept message, a second target direct communication request message is a second direct communication request message, and a second target direct communication accept message is a second direct communication accept message.

Figure 6:
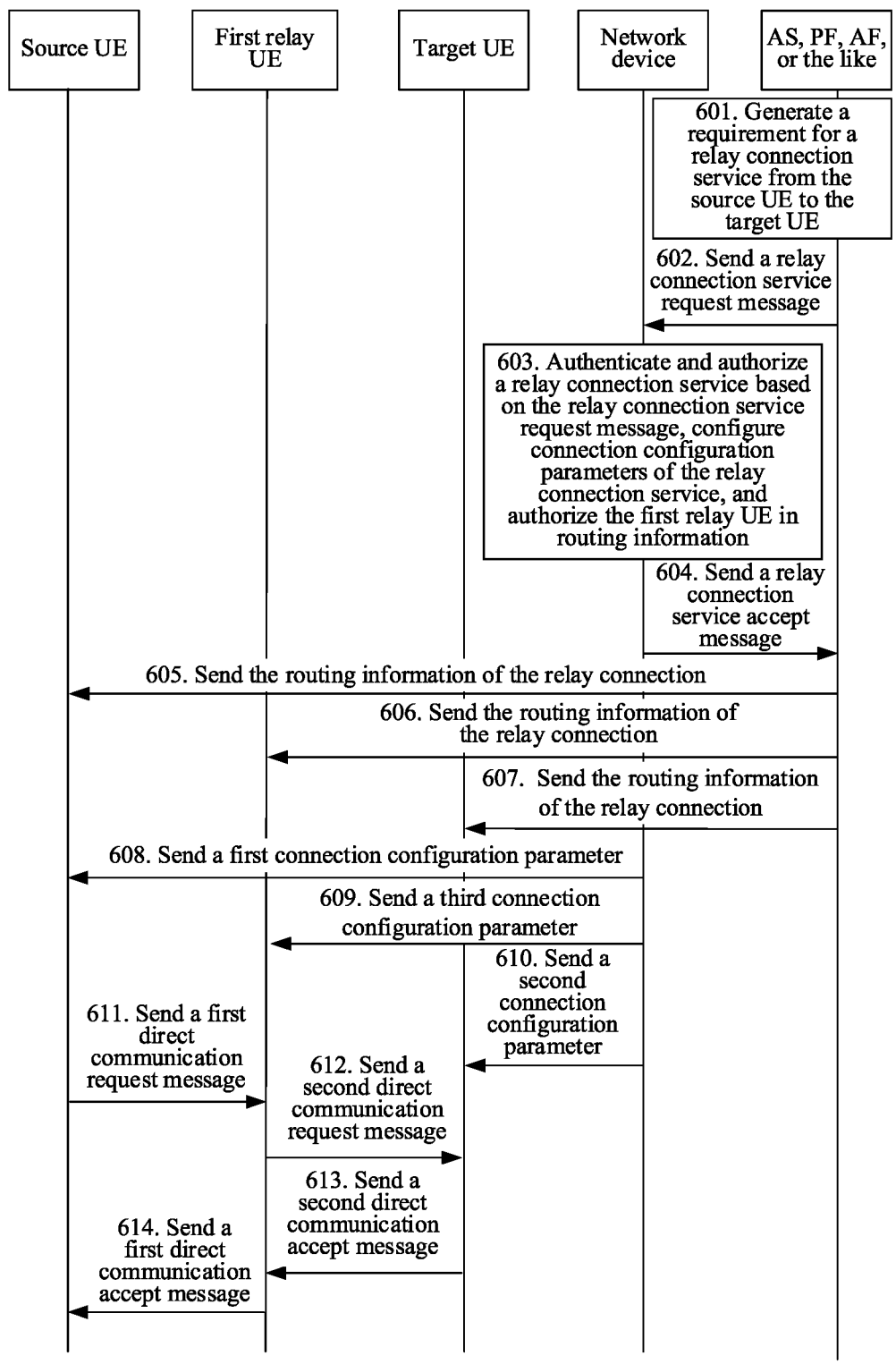
FIG. 6 is a fifth flowchart of a relay connection establishment method according to an embodiment of the present invention.

In a case, after accepting a relay connection service request message of an AS, a PF, an AF, or the like, a network device actively sends corresponding connection configuration parameters to the source UE, the first relay UE, and the target UE. As shown in FIG. 6, the relay connection establishment method provided in this embodiment of the present invention may include the following step 601 to step 614.

Step 601: The AS, PF, AF, or the like generates a requirement for a relay connection service from the source UE to the target UE.

Step 602: The AS, PF, AF, or the like sends a relay connection service request message to the network device.

The network device receives the relay connection service request message from the AS, PF, or AF.

For the description of the foregoing step 601 and step 602, reference may be made to the related description of the foregoing step 501. Details are not described herein again.

Step 603: The network device authenticates and authorizes a relay connection service based on the relay connection service request message, configures connection configuration parameters of the relay connection service, and authorizes the first relay UE in the routing information.

The connection configuration parameters include a first connection configuration parameter, a third connection configuration parameter, and a second connection configuration parameter. The third connection configuration parameter is the target connection configuration parameter of each relay UE in the foregoing step 503.

The third connection configuration parameter is used for establishing a first direct communication connection between the first relay UE and the source UE and a second direct communication connection between the first relay UE and the target UE in the process of establishing the relay connection.

In this embodiment of the present invention, the third connection configuration parameter is a configuration parameter configured by the network device for the first relay UE to establish the first direct communication connection to the source UE and establish the second direct communication connection to the target UE, such as a PC5 QoS parameter or a PC5 QoS rule.

For the description of the foregoing step 603, reference may be made to the related description of the foregoing step 502 and step 503. Details are not described herein again.

Step 604: The network device sends a relay connection service accept message to the AS, PF, AF, or the like.

The AS, PF, AF, or the like receives the relay connection service accept message from the network device.

Step 605: The AS, PF, AF, or the like sends the routing information of the relay connection to the source UE.

The source UE receives the routing information of the relay connection.

Step 606: The AS, PF, AF, or the like sends the routing information of the relay connection to the first relay UE.

The first relay UE receives the routing information of the relay connection.

Step 607: The AS, PF, AF, or the like sends the routing information of the relay connection to the target UE.

The target UE receives the routing information of the relay connection.

For the description of the foregoing step 604 to step 607, reference may be made to the related description of the foregoing step 504. Details are not described herein again.

Step 608: The network device sends the first connection configuration parameter to the source UE.

The source UE receives the first connection configuration parameter from the network device.

For the description of the foregoing step 608, reference may be made to the related description of the foregoing step 205 and step 206. Details are not described herein again.

Step 609: The network device sends the third connection configuration parameter to the first relay UE.

The first relay UE receives the third connection configuration parameter from the network device.

The third connection configuration parameter is the target connection configuration parameter in the foregoing step 409 and step 410.

For the description of the third connection configuration parameter in the foregoing step 609, reference may be made to the related description of the target connection configuration parameter in the foregoing step 409 and step 410. Details are not described herein again.

Step 610: The network device sends the second connection configuration parameter to the target UE.

The target UE receives the second connection configuration parameter from the network device.

For the description of the foregoing step 610, reference may be made to the related description of the foregoing step 305 and step 306. Details are not described herein again.

Step 611: The source UE sends a first direct communication request message to the first relay UE.

The first relay UE receives the first direct communication request message from the source UE.

Optionally, the first direct communication request message carries an identifier of the source UE, an identifier of the first relay UE, and an identifier of the target UE.

For the description of the foregoing step 611, reference may be made to the related description of the foregoing step 201 and step 202. Details are not described herein again.

Step 612: The first relay UE sends a second direct communication request message to the target UE.

The target UE receives the second direct communication request message from the first relay UE.

Optionally, the second direct communication request message carries an identifier of the source UE, an identifier of the first relay UE, and an identifier of the target UE.

For the description of the foregoing step 612, reference may be made to the related description of the foregoing step 301 and step 302. Details are not described herein again.

Step 613: The target UE sends a second direct communication accept message to the first relay UE.

The first relay UE receives the second direct communication accept message from the target UE.

Optionally, the second direct communication accept message carries an identifier of the source UE, an identifier of the first relay UE, and an identifier of the target UE.

For the description of the foregoing step 613, reference may be made to the related description of the foregoing step 303 and step 304. Details are not described herein again.

Step 614: The first relay UE sends a first direct communication accept message to the source UE.

The source UE receives the first direct communication accept message from the first relay UE.

Optionally, the first direct communication accept message carries an identifier of the source UE, an identifier of the first relay UE, and an identifier of the target UE.

For the description of the foregoing step 614, reference may be made to the related description of the foregoing step 203 and step 204. Details are not described herein again.

Figure 7:
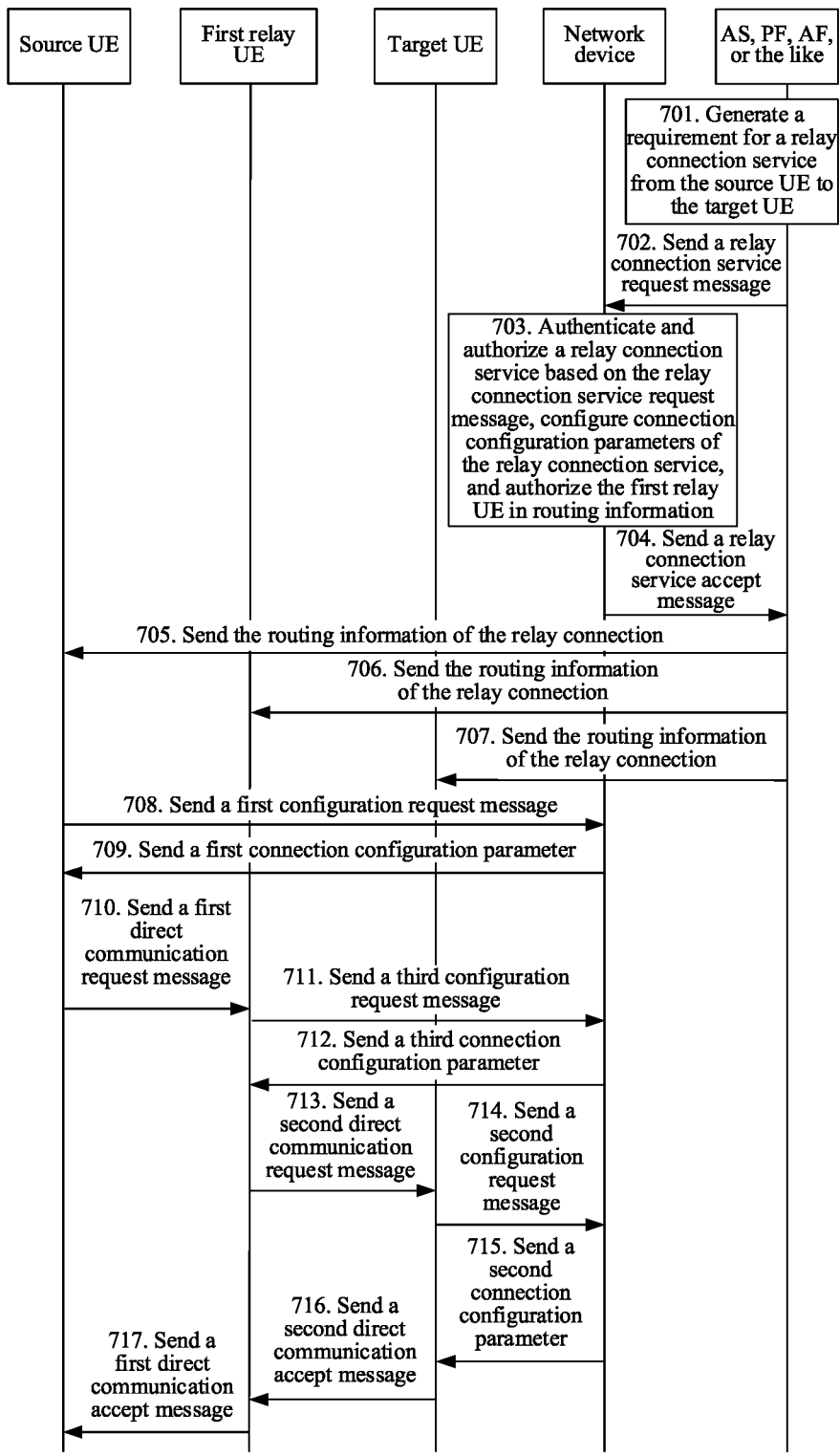
FIG. 7 is a sixth flowchart of a relay connection establishment method according to an embodiment of the present invention.

In a case, a network device does not send corresponding connection configuration parameters to source UE, first relay UE, and target UE until the network device accepts a relay connection service request message of an AS, a PF, an AF, or the like and receives corresponding configuration request messages sent by the source UE, the first relay UE, and the target UE. As shown in FIG. 7, the relay connection establishment method provided in this embodiment of the present invention may include the following step 701 to step 717.

Step 701: The AS, PF, AF, or the like generates a requirement for a relay connection service from the source UE to the target UE.

Step 702: The AS, PF, AF, or the like sends a relay connection service request message to the network device.

The network device receives the relay connection service request message from the AS, PF, or AF.

For the description of the foregoing step 701 and step 702, reference may be made to the related description of the foregoing step 501. Details are not described herein again.

Step 703: The network device authenticates and authorizes a relay connection service based on the relay connection service request message, configures connection configuration parameters of the relay connection service, and authorizes the first relay UE in the routing information.

The connection configuration parameters include a first connection configuration parameter, a third connection configuration parameter, and a second connection configuration parameter. The third connection configuration parameter is the target connection configuration parameter of each relay UE in the foregoing step 503.

The third connection configuration parameter is used for establishing a first direct communication connection between the first relay UE and the source UE and a second direct communication connection between the first relay UE and the target UE in the process of establishing the relay connection.

In this embodiment of the present invention, the third connection configuration parameter is a configuration parameter configured by the network device for the first relay UE to establish the first direct communication connection to the source UE and establish the second direct communication connection to the target UE, such as a PC5 QoS parameter or a PC5 QoS rule.

For the description of the foregoing step 603, reference may be made to the related description of the foregoing step 502 and step 503. Details are not described herein again.

Step 704: The network device sends a relay connection service accept message to the AS, PF, AF, or the like.

The AS, PF, AF, or the like receives the relay connection service accept message from the network device.

Step 705: The AS, PF, AF, or the like sends the routing information of the relay connection to the source UE.

The source UE receives the routing information of the relay connection.

Step 706: The AS, PF, AF, or the like sends the routing information of the relay connection to the first relay UE.

The first relay UE receives the routing information of the relay connection.

Step 707: The AS, PF, AF, or the like sends the routing information of the relay connection to the target UE.

The target UE receives the routing information of the relay connection.

For the description of the foregoing step 704 to step 707, reference may be made to the related description of the foregoing step 504. Details are not described herein again.

Step 708: The source UE sends a first configuration request message to the network device.

The network device receives the first configuration request message from the source UE.

For the description of the foregoing step 708, reference may be made to the related description of the foregoing step 207 and step 208. Details are not described herein again.

Step 709: The network device sends the first connection configuration parameter to the source UE.

The source UE receives the first connection configuration parameter from the network device.

For the description of the foregoing step 709, reference may be made to the related description of the foregoing step 205 and step 206. Details are not described herein again.

Step 710: The source UE sends a first direct communication request message to the first relay UE.

The first relay UE receives the first direct communication request message from the source UE.

Optionally, the first direct communication request message carries an identifier of the source UE, an identifier of the first relay UE, and an identifier of the target UE.

For the description of the foregoing step 710, reference may be made to the related description of the foregoing step 201 and step 202. Details are not described herein again.

Step 711: The first relay UE sends a third configuration request message to the network device.

The network device receives the third configuration request message from the first relay UE.

The third configuration request message is the target configuration request message in the foregoing step 411 and step 412.

For the description of the third configuration request message in the foregoing step 711, reference may be made to the related description of the target configuration request message in the foregoing step 411 and step 412. Details are not described herein again.

Step 712: The network device sends the third connection configuration parameter to the first relay UE.

The first relay UE receives the third connection configuration parameter from the network device.

The third connection configuration parameter is the target connection configuration parameter in the foregoing step 409 and step 410.

For the description of the third connection configuration parameter in the foregoing step 712, reference may be made to the related description of the target connection configuration parameter in the foregoing step 409 and step 410. Details are not described herein again.

Step 713: The first relay UE sends a second direct communication request message to the target UE.

The target UE receives the second direct communication request message from the first relay UE.

Optionally, the second direct communication request message carries an identifier of the source UE, an identifier of the first relay UE, and an identifier of the target UE.

For the description of the foregoing step 713, reference may be made to the related description of the foregoing step 301 and step 302. Details are not described herein again.

Step 714: The target UE sends a second configuration request message to the network device.

The network device receives the second configuration request message from the target UE.

For the description of the foregoing step 714, reference may be made to the related description of the foregoing step 307 and step 308. Details are not described herein again.

Step 715: The network device sends the second connection configuration parameter to the target UE.

The target UE receives the second connection configuration parameter from the network device.

For the description of the foregoing step 715, reference may be made to the related description of the foregoing step 305 and step 306. Details are not described herein again.

Step 716: The target UE sends a second direct communication accept message to the first relay UE.

The first relay UE receives the second direct communication accept message from the target UE.

Optionally, the second direct communication accept message carries an identifier of the source UE, an identifier of the first relay UE, and an identifier of the target UE.

For the description of the foregoing step 716, reference may be made to the related description of the foregoing step 303 and step 304. Details are not described herein again.

Step 717: The first relay UE sends a first direct communication accept message to the source UE.

The source UE receives the first direct communication accept message from the first relay UE.

Optionally, the first direct communication accept message carries an identifier of the source UE, an identifier of the first relay UE, and an identifier of the target UE.

For the description of the foregoing step 717, reference may be made to the related description of the foregoing step 203 and step 204. Details are not described herein again.

With reference to the foregoing embodiment, the following is an exemplary description of a process of establishing a relay connection based on an assumption that a relay connection from source UE to target UE includes two relay UEs.

The relay connection from the source UE to the target UE includes two relay UEs (denoted as first relay UE and second relay UE), and routing information is source UE→first relay UE→second relay UE→target UE. In this case, target relay UE may be the first relay UE or the second relay UE. Hereinafter assuming that the first relay UE is the target relay UE (that is, next-hop relay UE of the source UE), the second relay UE is next-hop relay UE of the target relay UE (that is, previous-hop relay UE of the target UE), a first target direct communication request message is a first direct communication request message, and a first target direct communication accept message is a first direct communication accept message. Hereinafter a second target direct communication request message is denoted as a third direct communication request message (used to request to establish, in the process of establishing the relay connection, a third direct communication connection between the first relay UE and the second relay UE), and a second target direct communication accept message is denoted as a third direct communication accept message (used to indicate acceptance of the request for establishing, in the process of establishing the relay connection, the third direct communication connection).

Figure 8:
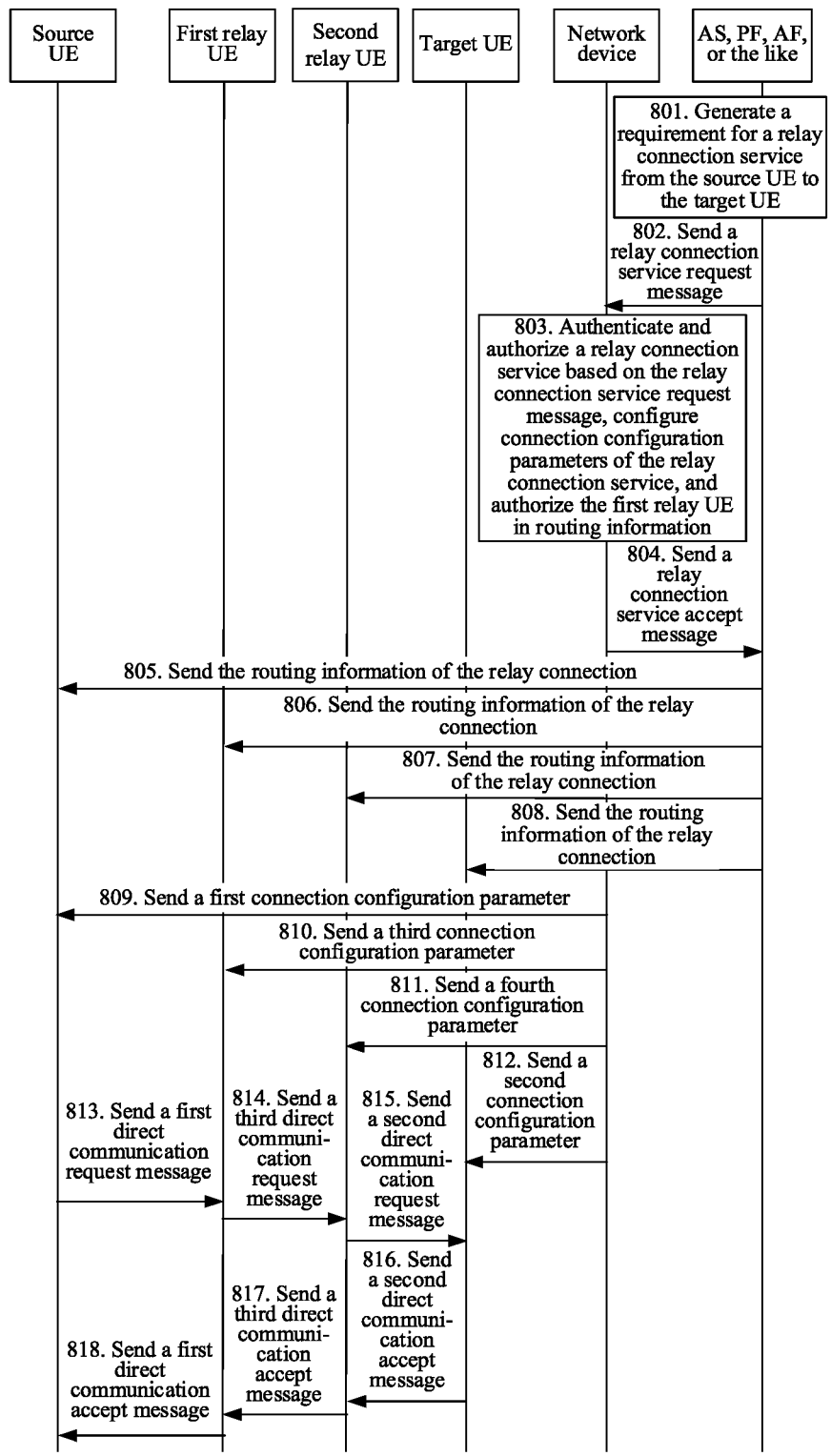
FIG. 8 is a seventh flowchart of a relay connection establishment method according to an embodiment of the present invention.

In a case, after accepting a relay connection service request message of an AS, a PF, an AF, or the like, a network device actively sends corresponding connection configuration parameters to the source UE, the first relay UE, the second relay UE, and the target UE. As shown in FIG. 8, the relay connection establishment method provided in this embodiment of the present invention may include the following step 801 to step 818.

Step 801: The AS, PF, AF, or the like generates a requirement for a relay connection service from the source UE to the target UE.

Step 802: The AS, PF, AF, or the like sends a relay connection service request message to the network device.

The network device receives the relay connection service request message from the AS, PF, or AF.

For the description of the foregoing step 801 and step 802, reference may be made to the related description of the foregoing step 501. Details are not described herein again.

Step 803: The network device authenticates and authorizes a relay connection service based on the relay connection service request message, configures connection configuration parameters of the relay connection service, and authorizes the first relay UE in the routing information.

The connection configuration parameters include a first connection configuration parameter, a third connection configuration parameter, a fourth connection configuration parameter, and a second connection configuration parameter. The third connection configuration parameter and the fourth connection configuration parameter are the target connection configuration parameter of each relay UE in the foregoing step 503.

The third connection configuration parameter is used for establishing a first direct communication connection between the first relay UE and the source UE and a third direct communication connection between the first relay UE and the second relay UE in the process of establishing the relay connection.

In this embodiment of the present invention, the third connection configuration parameter is a configuration parameter configured by the network device for the first relay UE to establish the first direct communication connection to the source UE and establish the third direct communication connection to the second relay UE, such as a PC5 QoS parameter or a PC5 QoS rule.

The fourth connection configuration parameter is used for establishing the third direct communication connection between the second relay UE and the first relay UE and a second direct communication connection between the second relay UE and the target UE in the process of establishing the relay connection.

In this embodiment of the present invention, the fourth connection configuration parameter is a configuration parameter configured by the network device for the second relay UE to establish the third direct communication connection to the first relay UE and establish the first direct communication connection to the target UE, such as a PC5 QoS parameter or a PC5 QoS rule.

For the description of the foregoing step 803, reference may be made to the related description of the foregoing step 502 and step 503. Details are not described herein again.

Step 804: The network device sends a relay connection service accept message to the AS, PF, AF, or the like.

The AS, PF, AF, or the like receives the relay connection service accept message from the network device.

Step 805: The AS, PF, AF, or the like sends the routing information of the relay connection to the source UE.

The source UE receives the routing information of the relay connection.

Step 806: The AS, PF, AF, or the like sends the routing information of the relay connection to the first relay UE.

The first relay UE receives the routing information of the relay connection.

Step 807: The AS, PF, AF, or the like sends the routing information of the relay connection to the second relay UE.

The second relay UE receives the routing information of the relay connection.

Step 808: The AS, PF, AF, or the like sends the routing information of the relay connection to the target UE.

The target UE receives the routing information of the relay connection.

For the description of the foregoing step 804 to step 808, reference may be made to the related description of the foregoing step 504. Details are not described herein again.

Step 809: The network device sends the first connection configuration parameter to the source UE.

The source UE receives the first connection configuration parameter from the network device.

For the description of the foregoing step 809, reference may be made to the related description of the foregoing step 205 and step 206. Details are not described herein again.

Step 810: The network device sends the third connection configuration parameter to the first relay UE.

The first relay UE receives the third connection configuration parameter from the network device.

The third connection configuration parameter is the target connection configuration parameter in the foregoing step 409 and step 410.

For the description of the third connection configuration parameter in the foregoing step 810, reference may be made to the related description of the target connection configuration parameter in the foregoing step 409 and step 410. Details are not described herein again.

Step 811: The network device sends the fourth connection configuration parameter to the second relay UE.

The second relay UE receives the fourth connection configuration parameter from the network device.

For the description of the fourth connection configuration parameter in the foregoing step 811, reference may be made to the related description of the target connection configuration parameter in the foregoing step 409 and step 410. Details are not described herein again.

Step 812: The network device sends the second connection configuration parameter to the target UE.

The target UE receives the second connection configuration parameter from the network device.

For the description of the foregoing step 812, reference may be made to the related description of the foregoing step 305 and step 306. Details are not described herein again.

Step 813: The source UE sends a first direct communication request message to the first relay UE.

The first relay UE receives the first direct communication request message from the source UE.

Optionally, the first direct communication request message carries an identifier of the source UE, an identifier of the first relay UE, and an identifier of the target UE.

For the description of the foregoing step 813, reference may be made to the related description of the foregoing step 201 and step 202. Details are not described herein again.

Step 814: The first relay UE sends a third direct communication request message to the second relay UE.

The second relay UE receives the third direct communication request message from the first relay UE.

Optionally, the third direct communication request message carries an identifier of the source UE, an identifier of the first relay UE, an identifier of the second relay UE, and an identifier of the target UE.

For the description of the foregoing step 814, reference may be made to the related description of the foregoing step 403 and step 404. Details are not described herein again.

Step 815: The second relay UE sends a second direct communication request message to the target UE.

The target UE receives the second direct communication request message from the second relay UE.

Optionally, the second direct communication request message carries an identifier of the source UE, an identifier of the second relay UE, and an identifier of the target UE.

For the description of the foregoing step 815, reference may be made to the related description of the foregoing step 301 and step 302. Details are not described herein again.

Step 816: The target UE sends a second direct communication accept message to the second relay UE.

The second relay UE receives the second direct communication accept message from the target UE.

Optionally, the second direct communication accept message carries an identifier of the source UE, an identifier of the second relay UE, and an identifier of the target UE.

For the description of the foregoing step 816, reference may be made to the related description of the foregoing step 303 and step 304. Details are not described herein again.

Step 817: The second relay UE sends a third direct communication accept message to the first relay UE.

The first relay UE receives the third direct communication accept message from the second relay UE.

Optionally, the third direct communication accept message carries an identifier of the source UE, an identifier of the first relay UE, an identifier of the second relay UE, and an identifier of the target UE.

For the description of the foregoing step 817, reference may be made to the related description of the foregoing step 405 and step 406. Details are not described herein again.

Step 818: The first relay UE sends a first direct communication accept message to the source UE.

The source UE receives the first direct communication accept message from the first relay UE.

Optionally, the first direct communication accept message carries an identifier of the source UE, an identifier of the first relay UE, and an identifier of the target UE.

For the description of the foregoing step 818, reference may be made to the related description of the foregoing step 203 and step 204. Details are not described herein again.

Figure 9:
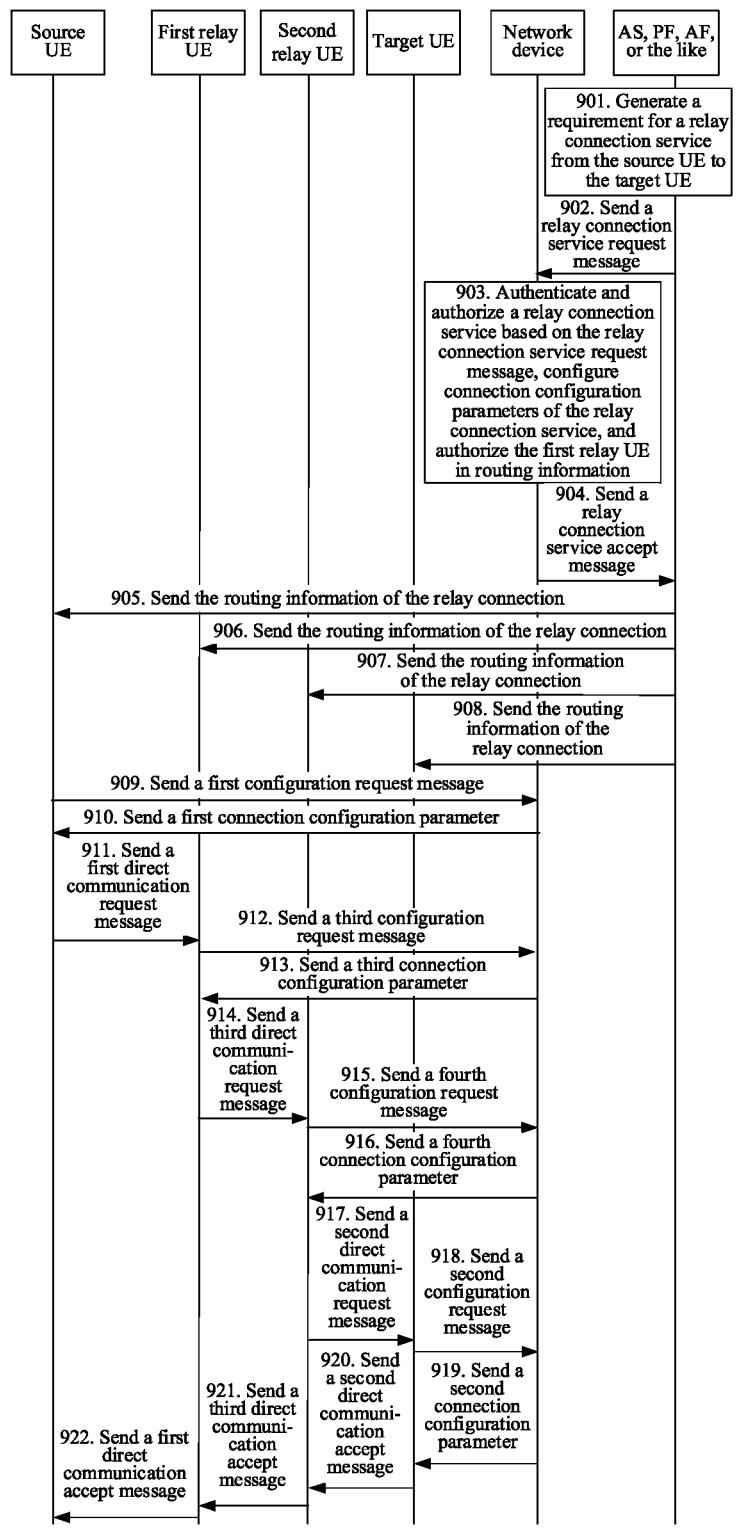
FIG. 9 is an eighth flowchart of a relay connection establishment method according to an embodiment of the present invention.

In a case, a network device does not send corresponding connection configuration parameters to source UE, first relay UE, second relay UE, and target UE until the network device accepts a relay connection service request message of an AS, a PF, an AF, or the like and receives corresponding configuration request messages sent by the source UE, the first relay UE, the second relay UE, and the target UE. As shown in FIG. 9, the relay connection establishment method provided in this embodiment of the present invention may include the following step 901 and step 922.

Step 901: The AS, PF, AF, or the like generates a requirement for a relay connection service from the source UE to the target UE.

Step 902: The AS, PF, AF, or the like sends a relay connection service request message to the network device.

The network device receives the relay connection service request message from the AS, PF, or AF.

For the description of the foregoing step 901 and step 902, reference may be made to the related description of the foregoing step 501. Details are not described herein again.

Step 903: The network device authenticates and authorizes a relay connection service based on the relay connection service request message, configures connection configuration parameters of the relay connection service, and authorizes the first relay UE in the routing information.

The connection configuration parameters include a first connection configuration parameter, a third connection configuration parameter, a fourth connection configuration parameter, and a second connection configuration parameter. The third connection configuration parameter and the fourth connection configuration parameter are the target connection configuration parameter of each relay UE in the foregoing step 503.

The third connection configuration parameter is used for establishing a first direct communication connection between the first relay UE and the source UE and a third direct communication connection between the first relay UE and the second relay UE in the process of establishing the relay connection.

In this embodiment of the present invention, the third connection configuration parameter is a configuration parameter configured by the network device for the first relay UE to establish the first direct communication connection to the source UE and establish the third direct communication connection to the second relay UE, such as a PC5 QoS parameter or a PC5 QoS rule.

The fourth connection configuration parameter is used for establishing the third direct communication connection between the second relay UE and the first relay UE and a second direct communication connection between the second relay UE and the target UE in the process of establishing the relay connection.

In this embodiment of the present invention, the fourth connection configuration parameter is a configuration parameter configured by the network device for the second relay UE to establish the third direct communication connection to the first relay UE and establish the first direct communication connection to the target UE, such as a PC5 QoS parameter or a PC5 QoS rule.

For the description of the foregoing step 903, reference may be made to the related description of the foregoing step 502 and step 503. Details are not described herein again.

Step 904: The network device sends a relay connection service accept message to the AS, PF, AF, or the like.

The AS, PF, AF, or the like receives the relay connection service accept message from the network device.

Step 905: The AS, PF, AF, or the like sends the routing information of the relay connection to the source UE.

The source UE receives the routing information of the relay connection.

Step 906: The AS, PF, AF, or the like sends the routing information of the relay connection to the first relay UE.

The first relay UE receives the routing information of the relay connection.

Step 907: The AS, PF, AF, or the like sends the routing information of the relay connection to the second relay UE.

The second relay UE receives the routing information of the relay connection.

Step 908: The AS, PF, AF, or the like sends the routing information of the relay connection to the target UE.

The target UE receives the routing information of the relay connection.

For the description of the foregoing step 904 to step 908, reference may be made to the related description of the foregoing step 504. Details are not described herein again.

Step 909: The source UE sends a first configuration request message to the network device.

The network device receives the first configuration request message from the source UE.

For the description of the foregoing step 909, reference may be made to the related description of the foregoing step 207 and step 208. Details are not described herein again.

Step 910: The network device sends the first connection configuration parameter to the source UE.

The source UE receives the first connection configuration parameter from the network device.

For the description of the foregoing step 910, reference may be made to the related description of the foregoing step 205 and step 206. Details are not described herein again.

Step 911: The source UE sends a first direct communication request message to the first relay UE.

The first relay UE receives the first direct communication request message from the source UE.

Optionally, the first direct communication request message carries an identifier of the source UE, an identifier of the first relay UE, and an identifier of the target UE.

For the description of the foregoing step 911, reference may be made to the related description of the foregoing step 201 and step 202. Details are not described herein again.

Step 912: The first relay UE sends a third configuration request message to the network device.

The network device receives the third configuration request message from the first relay UE.

The third configuration request message is the target configuration request message in the foregoing step 411 and step 412.

For the description of the third configuration request message in the foregoing step 912, reference may be made to the related description of the target configuration request message in the foregoing step 411 and step 412. Details are not described herein again.

Step 913: The network device sends the third connection configuration parameter to the first relay UE.

The first relay UE receives the third connection configuration parameter from the network device.

The third connection configuration parameter is the target connection configuration parameter in the foregoing step 409 and step 410.

For the description of the third connection configuration parameter in the foregoing step 913, reference may be made to the related description of the target connection configuration parameter in the foregoing step 409 and step 410. Details are not described herein again.

Step 914: The first relay UE sends a third direct communication request message to the second relay UE.

The second relay UE receives the third direct communication request message from the first relay UE.

Optionally, the third direct communication request message carries an identifier of the source UE, an identifier of the first relay UE, an identifier of the second relay UE, and an identifier of the target UE.

For the description of the foregoing step 914, reference may be made to the related description of the foregoing step 403 and step 404. Details are not described herein again.

Step 915: The second relay UE sends a fourth configuration request message to the network device.

The network device receives the fourth configuration request message from the second relay UE.

For the description of the fourth connection configuration request message in the foregoing step 915, reference may be made to the related description of the target configuration request message in the foregoing step 411 and step 412. Details are not described herein again.

Step 916: The network device sends the fourth connection configuration parameter to the second relay UE.

The second relay UE receives the fourth connection configuration parameter from the network device.

For the description of the fourth connection configuration parameter in the foregoing step 916, reference may be made to the related description of the target connection configuration parameter in the foregoing step 409 and step 410. Details are not described herein again.

Step 917: The second relay UE sends a second direct communication request message to the target UE.

The target UE receives the second direct communication request message from the second relay UE.

Optionally, the second direct communication request message carries an identifier of the source UE, an identifier of the second relay UE, and an identifier of the target UE.

For the description of the foregoing step 917, reference may be made to the related description of the foregoing step 301 and step 302. Details are not described herein again.

Step 918: The target UE sends a second configuration request message to the network device.

The network device receives the second configuration request message from the target UE.

For the description of the foregoing step 918, reference may be made to the related description of the foregoing step 307 and step 308. Details are not described herein again.

Step 919: The network device sends the second connection configuration parameter to the target UE.

The target UE receives the second connection configuration parameter from the network device.

For the description of the foregoing step 919, reference may be made to the related description of the foregoing step 305 and step 306. Details are not described herein again.

Step 920: The target UE sends a second direct communication accept message to the second relay UE.

The second relay UE receives the second direct communication accept message from the target UE.

Optionally, the second direct communication accept message carries an identifier of the source UE, an identifier of the second relay UE, and an identifier of the target UE.

For the description of the foregoing step 920, reference may be made to the related description of the foregoing step 303 and step 304. Details are not described herein again.

Step 921: The second relay UE sends a third direct communication accept message to the first relay UE.

The first relay UE receives the third direct communication accept message from the second relay UE.

Optionally, the third direct communication accept message carries an identifier of the source UE, an identifier of the first relay UE, an identifier of the second relay UE, and an identifier of the target UE.

For the description of the foregoing step 921, reference may be made to the related description of the foregoing step 405 and step 406. Details are not described herein again.

Step 922: The first relay UE sends a first direct communication accept message to the source UE.

The source UE receives the first direct communication accept message from the first relay UE.

Optionally, the first direct communication accept message carries an identifier of the source UE, an identifier of the first relay UE, and an identifier of the target UE.

For the description of the foregoing step 922, reference may be made to the related description of the foregoing step 203 and step 204. Details are not described herein again.

Figure 10:
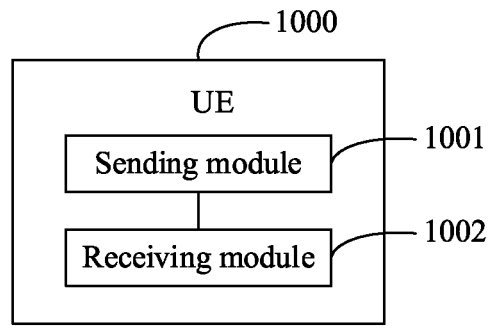
FIG. 10 is a schematic structural diagram of UE according to an embodiment of the present invention.

As shown in FIG. 10, an embodiment of the present invention provides UE 1000, where the UE 1000 is source UE, and the UE 1000 includes a sending module 1001 and a receiving module 1002. The sending module 1001 is configured to send a first direct communication request message to next-hop relay UE of the source UE, where the first direct communication request message is used to request to establish, in a process of establishing a relay connection from the source UE to target UE, a first direct communication connection between the source UE and the next-hop relay UE of the source UE. The receiving module 1002 is configured to receive a first direct communication accept message from the next-hop relay UE of the source UE, where the first direct communication accept message is used to indicate acceptance of the request for establishing the first direct communication connection in the process of establishing the relay connection.

Optionally, the first direct communication request message and the first direct communication accept message both carry an identifier of the source UE, an identifier of the next-hop relay UE of the source UE, and an identifier of the target UE.

Optionally, the sending module 1001 is specifically configured to send the first direct communication request message to the next-hop relay UE of the source UE based on a first connection configuration parameter, where the first connection configuration parameter is used for establishing the first direct communication connection in the process of establishing the relay connection.

Optionally, before the sending module 1001 sends the first direct communication request message to the next-hop relay UE of the source UE based on the first connection configuration parameter, the receiving module 1002 is further configured to receive the first connection configuration parameter from a network device.

Optionally, before the receiving module 1002 receives the first connection configuration parameter from the network device, the sending module 1001 is further configured to send a first configuration request message to the network device, where the first configuration request message is used to request the network device to configure the first connection configuration parameter for the source UE.

The UE provided in this embodiment of the present invention can implement the process shown in the foregoing embodiment. To avoid repetition, details are not described herein again.

In a case in which the UE provided in this embodiment of the present invention is the source UE, the source UE may send the first direct communication request message to the next-hop relay UE of the source UE, and receive the first direct communication accept message from the next-hop relay UE of the source UE, where the first direct communication request message is used to request to establish, in the process of establishing the relay connection from the source UE to the target UE, the first direct communication connection between the source UE and the next-hop relay UE of the source UE; and the first direct communication accept message is used to indicate acceptance of the request for establishing the first direct communication connection in the process of establishing the relay connection. In this solution, the first direct communication connection between the source UE and the next-hop relay UE of the source UE is established, so that the relay connection from the source UE to the target UE can be established. In this way, communication quality of the connection established between the UEs can be improved.

As shown in FIG. 10, an embodiment of the present invention provides UE 1000, where the UE 1000 is target relay UE, and the UE 1000 includes a receiving module 1002 and a sending module 1001. The receiving module 1002 is configured to receive a first target direct communication request message from first UE, where the first UE is source UE or previous-hop relay UE of the target relay UE, and the first target direct communication request message is used to request to establish, in a process of establishing a relay connection from the source UE to target UE, a first target direct communication connection between the first UE and the target relay UE. The sending module 1001 is configured to send a second target direct communication request message to second UE, where the second UE is the target UE or next-hop relay UE of the target relay UE, and the second target direct communication request message is used to request to establish, in the process of establishing the relay connection, a second target direct communication connection between the target relay UE and the second UE. The receiving module 1002 is further configured to receive a second target direct communication accept message from the second UE, where the second target direct communication accept message is used to indicate acceptance of the request for establishing the second target direct communication connection in the process of establishing the relay connection, The sending module 1001 is further configured to send a first target direct communication accept message to the first UE, where the first target direct communication accept message is used to indicate acceptance of the request for establishing, in the process of establishing the relay connection, the first target direct communication connection.

Optionally, in a case in which the first UE is the source UE, the first target direct communication request message and the first target direct communication accept message both carry an identifier of the source UE, an identifier of the target relay UE, and an identifier of the target UE; in a case in which the first UE is the previous-hop relay UE of the target relay UE, the first target direct communication request message and the first target direct communication accept message both carry an identifier of the source UE, an identifier of the first UE, an identifier of the target relay UE, and an identifier of the target UE; in a case in which the second UE is the target UE, the second target direct communication request message and the second target direct communication accept message both carry an identifier of the source UE, an identifier of the target relay UE, and an identifier of the target UE; or in a case in which the second UE is the next-hop relay UE of the target relay UE, the second target direct communication request message and the second target direct communication accept message both carry an identifier of the source UE, an identifier of the target relay UE, an identifier of the second UE, and an identifier of the target UE.

Optionally, the sending module 1001 is specifically configured to send the second target direct communication request message to the second UE based on a target connection configuration parameter, where the target connection configuration parameter is used for establishing the first target direct communication connection and the second target direct communication connection in the process of establishing the relay connection.

Optionally, before the sending module 1001 sends the second target direct communication request message to the second UE based on the target connection configuration parameter, the receiving module 1002 is further configured to receive the target connection configuration parameter from a network device.

Optionally, before the receiving module 1002 receives the target connection configuration parameter from the network device, the sending module 1001 is further configured to send a target configuration request message to the network device, where the target configuration request message is used to request the network device to configure the target connection configuration parameter for the target relay UE.

The UE provided in this embodiment of the present invention can implement the process shown in the foregoing embodiment. To avoid repetition, details are not described herein again.

In a case in which the UE provided in this embodiment of the present invention is the target relay UE, the target relay UE may receive the first target direct communication request message from the first UE, send the second target direct communication request message to the second UE, receive the second target direct communication accept message from the second UE, and send the first target direct communication accept message to the first UE, where the first UE is the source UE or the previous-hop relay UE of the target relay UE, and the first target direct communication request message is used to request to establish, in the process of establishing the relay connection from the source UE to the target UE, the first target direct communication connection between the first UE and the target relay UE; the second UE is the target UE or the next-hop relay UE of the target relay UE, and the second target direct communication request message is used to request to establish, in the process of establishing the relay connection, the second target direct communication connection between the target relay UE and the second UE; the second target direct communication accept message is used to indicate acceptance of the request for establishing the second target direct communication connection in the process of establishing the relay connection; and the first target direct communication accept message is used to indicate acceptance of the request for establishing, in the process of establishing the relay connection, the first target direct communication connection. In this solution, the first target direct communication connection between the first UE and the target relay UE is established, and the second target direct communication connection between the target relay UE and the second UE is established, so that the relay connection from the source UE to the target UE can be established. In this way, communication quality of the connection established between the UEs can be improved.

As shown in FIG. 10, an embodiment of the present invention provides UE 1000, where the UE 1000 is target UE, and the UE 1000 includes a receiving module 1002 and a sending module 1001. The receiving module 1002 is configured to receive a second direct communication request message from previous-hop relay UE of the target UE, where the second direct communication request message is used to request to establish, in a process of establishing a relay connection from source UE to the target UE, a second direct communication connection between the target UE and the previous-hop relay UE of the target UE. The sending module 1001 is configured to send a second direct communication accept message to the previous-hop relay UE of the target UE, where the second direct communication accept message is used to indicate acceptance of the request for establishing the second direct communication connection in the process of establishing the relay connection.

Optionally, the second direct communication request message and the second direct communication accept message both carry an identifier of the source UE, an identifier of the previous-hop relay UE of the target UE, and an identifier of the target UE.

Optionally, the sending module 1001 is specifically configured to send the second direct communication accept message to the previous-hop relay UE of the target UE based on a second connection configuration parameter, where the second connection configuration parameter is used for establishing the second direct communication connection in the process of establishing the relay connection.

Optionally, before the sending module 1001 sends the second direct communication accept message to the previous-hop relay UE of the target UE based on the second connection configuration parameter, the receiving module 1002 is further configured to receive the second connection configuration parameter from a network device.

Optionally, before the receiving module 1002 receives the second connection configuration parameter from the network device, the sending module 1001 is further configured to send a second configuration request message to the network device, where the second configuration request message is used to request the network device to configure the second connection configuration parameter for the target UE.

The UE provided in this embodiment of the present invention can implement the process shown in the foregoing embodiment. To avoid repetition, details are not described herein again.

In a case in which the UE provided in this embodiment of the present invention is the target UE, the target UE may receive the second direct communication request message from the previous-hop relay UE of the target UE, and send the second direct communication accept message to the previous-hop relay UE of the target UE, where the second direct communication request message is used to request to establish, in the process of establishing the relay connection from the source UE to the target UE, the second direct communication connection between the target UE and the previous-hop relay UE of the target UE; and the second direct communication accept message is used to indicate acceptance of the request for establishing the second direct communication connection in the process of establishing the relay connection. In this solution, the second direct communication connection between the target UE and the previous-hop relay UE of the target UE is established, so that the relay connection from the source UE to the target UE can be established. In this way, communication quality of the connection established between the UEs can be improved.

Figure 11:
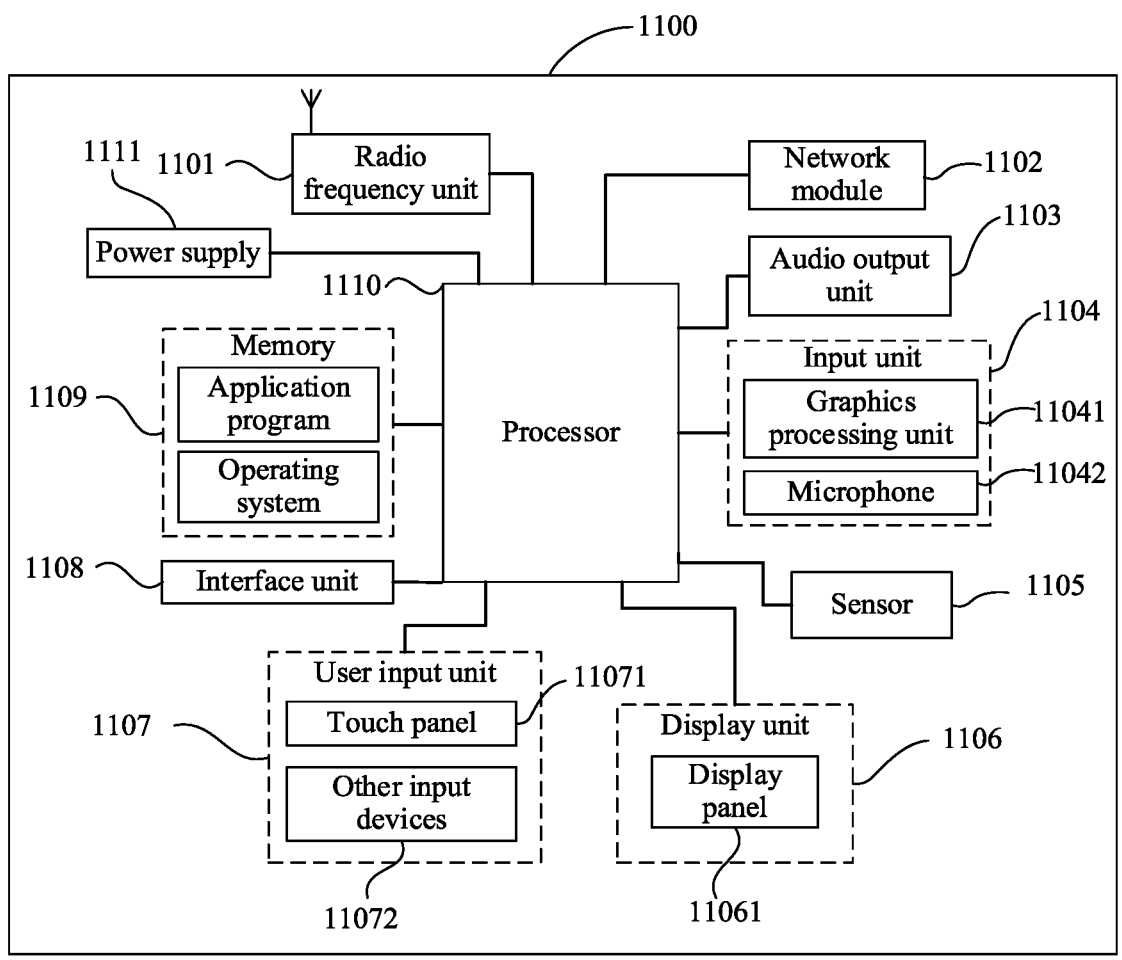
FIG. 11 is a schematic hardware diagram of UE according to an embodiment of the present invention.

FIG. 11 is a schematic diagram of a hardware structure of UE for implementing each embodiment of the present invention. The UE 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, a processor 1110, and a power supply 1111. A person skilled in the art can understand that the structure of the UE 1100 shown in FIG. 11 does not constitute any limitation on the UE, and the UE 1100 may include more or fewer components than those shown in the figure, or a combination of some of the components, or a different arrangement of the components. In this embodiment of the present invention, the UE 1100 includes but is not limited to a mobile phone, a tablet computer, a notebook computer, a palmtop computer, in-vehicle UE, a wearable device, a pedometer, or the like.

In a case, the UE 1100 is source UE, and the radio frequency unit 1101 is configured to send a first direct communication request message to next-hop relay UE of the source UE, where the first direct communication request message is used to request to establish, in a process of establishing a relay connection from the source UE to target UE, a first direct communication connection between the source UE and the next-hop relay UE of the source UE; and receive a first direct communication accept message from the next-hop relay UE of the source UE, where the first direct communication accept message is used to indicate acceptance of the request for establishing the first direct communication connection in the process of establishing the relay connection.

The UE provided in this embodiment of the present invention is the source UE, and the source UE may send the first direct communication request message to the next-hop relay UE of the source UE, and receive the first direct communication accept message from the next-hop relay UE of the source UE, where the first direct communication request message is used to request to establish, in the process of establishing the relay connection from the source UE to the target UE, the first direct communication connection between the source UE and the next-hop relay UE of the source UE; and the first direct communication accept message is used to indicate acceptance of the request for establishing the first direct communication connection in the process of establishing the relay connection. In this solution, the first direct communication connection between the source UE and the next-hop relay UE of the source UE is established, so that the relay connection from the source UE to the target UE can be established. In this way, communication quality of the connection established between the UEs can be improved.

In a case, the UE 1100 is target relay UE, and the radio frequency unit 1101 is configured to receive a first target direct communication request message from first UE, where the first UE is source UE or previous-hop relay UE of the target relay UE, and the first target direct communication request message is used to request to establish, in a process of establishing a relay connection from the source UE to target UE, a first target direct communication connection between the first UE and the target relay UE; send a second target direct communication request message to second UE, where the second UE is the target UE or next-hop relay UE of the target relay UE, and the second target direct communication request message is used to request to establish, in the process of establishing the relay connection, a second target direct communication connection between the target relay UE and the second UE; receive a second target direct communication accept message from the second UE, where the second target direct communication accept message is used to indicate acceptance of the request for establishing the second target direct communication connection in the process of establishing the relay connection; and send a first target direct communication accept message to the first UE, where the first target direct communication accept message is used to indicate acceptance of the request for establishing, in the process of establishing the relay connection, the first target direct communication connection.

The UE provided in this embodiment of the present invention is the target relay UE, and the target relay UE may receive the first target direct communication request message from the first UE, send the second target direct communication request message to the second UE, receive the second target direct communication accept message from the second UE, and send the first target direct communication accept message to the first UE, where the first UE is the source UE or the previous-hop relay UE of the target relay UE, and the first target direct communication request message is used to request to establish, in the process of establishing the relay connection from the source UE to the target UE, the first target direct communication connection between the first UE and the target relay UE; the second UE is the target UE or the next-hop relay UE of the target relay UE, and the second target direct communication request message is used to request to establish, in the process of establishing the relay connection, the second target direct communication connection between the target relay UE and the second UE; the second target direct communication accept message is used to indicate acceptance of the request for establishing the second target direct communication connection in the process of establishing the relay connection; and the first target direct communication accept message is used to indicate acceptance of the request for establishing, in the process of establishing the relay connection, the first target direct communication connection. In this solution, the first target direct communication connection between the first UE and the target relay UE is established, and the second target direct communication connection between the target relay UE and the second UE is established, so that the relay connection from the source UE to the target UE can be established. In this way, communication quality of the connection established between the UEs can be improved.

In a case, the UE 1100 is target UE, and the radio frequency unit 1101 is configured to receive a second direct communication request message from previous-hop relay UE of the target UE, where the second direct communication request message is used to request to establish, in a process of establishing a relay connection from source UE to the target UE, a second direct communication connection between the target UE and the previous-hop relay UE of the target UE; and send a second direct communication accept message to the previous-hop relay UE of the target UE, where the second direct communication accept message is used to indicate acceptance of the request for establishing the second direct communication connection in the process of establishing the relay connection.

The UE provided in this embodiment of the present invention is the target UE, and the target UE may receive the second direct communication request message from the previous-hop relay UE of the target UE, and send the second direct communication accept message to the previous-hop relay UE of the target UE, where the second direct communication request message is used to request to establish, in the process of establishing the relay connection from the source UE to the target UE, the second direct communication connection between the target UE and the previous-hop relay UE of the target UE; and the second direct communication accept message is used to indicate acceptance of the request for establishing the second direct communication connection in the process of establishing the relay connection. In this solution, the second direct communication connection between the target UE and the previous-hop relay UE of the target UE is established, so that the relay connection from the source UE to the target UE can be established. In this way, communication quality of the connection established between the UEs can be improved.

It should be understood that in this embodiment of the present invention, the radio frequency unit 1101 may be configured to receive and send signals in an information reception or transmission or call process. Specifically, after receiving downlink data from a base station, the radio frequency unit 1101 sends the downlink data to the processor 1110 for processing, and in addition, sends uplink data to the base station. Generally, the radio frequency unit 1101 includes but is not limited to an antenna, at least one amplifier, a transceiver, a coupler, a low noise amplifier, a duplexer, and the like. In addition, the radio frequency unit 1101 may also communicate with a network and other devices via a wireless communications system.

The UE 1100 provides wireless broadband Internet access for a user by using the network module 1102, for example, helps the user send and receive e-mails, browse web pages, and access streaming media.

The audio output unit 1103 may convert audio data received by the radio frequency unit 1101 or the network module 1102 or stored in the memory 1109 into an audio signal and output the audio signal as a sound. In addition, the audio output unit 1103 may also provide audio output (for example, a call signal reception sound or a message reception sound) related to a specific function performed by the UE 1100. The audio output unit 1103 includes a speaker, a buzzer, a receiver, and the like.

The input unit 1104 is configured to receive an audio or video signal. The input unit 1104 may include a graphics processing unit (GPU) 11041 and a microphone 11042. The graphics processing unit 11041 processes image data of a still picture or video obtained by an image capture apparatus (such as a camera) in a video capture mode or an image capture mode. A processed image frame may be displayed on the display unit 1106. The image frame processed by the graphics processing unit 11041 may be stored in the memory 1109 (or another storage medium) or be sent by the radio frequency unit 1101 or the network module 1102. The microphone 11042 is capable of receiving sounds and processing such sounds into audio data. The processed audio data can be converted into a format output that can be sent to a mobile communication base station through the radio frequency unit 1101 in a telephone call mode.

The UE 1100 further includes at least one sensor 1105, for example, an optical sensor, a motion sensor, and another sensor. Specifically, the optical sensor includes an ambient light sensor and a proximity sensor. The ambient light sensor may adjust luminance of the display panel 11061 based on brightness of ambient light, and the proximity sensor may turn off the display panel 11061 and/or backlight when the UE 1100 moves close to an ear. As a type of motion sensor, an accelerometer sensor may detect acceleration magnitudes in all directions (generally three axes), and when the accelerometer sensor is stationary, may detect a magnitude and a direction of gravity, and may be configured to recognize a posture of the UE (such as switching between landscape and portrait, related games, and magnetometer posture calibration), implement vibration recognition related functions (such as a pedometer and stroke), and the like. The sensor 1105 may further include a fingerprint sensor, a pressure sensor, an iris sensor, a molecular sensor, a gyroscope, a barometer, a hygrometer, a thermometer, an infrared sensor, and the like. Details are not described herein.

The display unit 1106 is configured to display information input by the user or information provided to the user. The display unit 1106 may include the display panel 11061, and the display panel 11061 may be configured in a form of a liquid crystal display (LCD), an organic light-emitting diode (OLED), or the like.

The user input unit 1107 may be configured to receive input digit or character information, and generate a key signal input related to a user setting and function control of the UE 1100. Specifically, the user input unit 1107 includes a touch panel 11071 and other input devices 11072. The touch panel 11071 is also referred to as a touchscreen and can collect a touch operation (such as an operation performed by the user on the touch panel 11071 or near the touch panel 11071 with a finger or by using any proper object or accessory such as a stylus) of the user on or near the touch panel 11071. The touch panel 11071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 1110, and can receive a command sent by the processor 1110 and execute the command. In addition, the touch panel 11071 may be implemented in a plurality of forms, for example, as a resistive, capacitive, infrared, or surface acoustic wave touch panel. The user input unit 1107 may further include other input devices 11072 in addition to the touch panel 11071. Specifically, the other input devices 11072 may include but are not limited to a physical keyboard, a function key (such as a volume control key or a switch key), a trackball, a mouse, and a joystick. Details are not described herein.

Further, the touch panel 11071 may cover the display panel 11061. When detecting a touch operation on or near the touch panel 11071, the touch panel 11071 transmits the touch operation to the processor 1110 to determine a type of a touch event. Then, the processor 1110 provides a corresponding visual output on the display panel 11061 based on the type of the touch event. Although in FIG. 11, the touch panel 11071 and the display panel 11061 are used as two independent parts to implement input and output functions of the UE 1100, in some embodiments, the touch panel 11071 and the display panel 11061 may be integrated to implement the input and output functions of the UE 1100. This is not specifically limited herein.

The interface unit 1108 is an interface between an external apparatus and the UE 1100. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 1108 may be configured to receive an input (for example, data information or power) from an external apparatus and transmit the received input to one or more elements within the UE 1100, or may be configured to transmit data between the UE 1100 and the external apparatus.

The memory 1109 may be configured to store software programs and various data. The memory 1109 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 1109 may include a high-speed random access memory, and may further include a non-volatile memory such as a disk storage device, a flash memory device, or another volatile solid-state storage device.

The processor 1110 is a control center of the UE 1100. The processor 1110 uses various interfaces and lines to connect all parts of the entire UE 1100, and performs various functions and data processing of the UE 1100 by running or executing the software program and/or module stored in the memory 1109 and invoking data stored in the memory 1109, thereby performing overall monitoring on the UE 1100. The processor 1110 may include one or more processing units. Optionally, an application processor and a modem processor may be integrated in the processor 1110. The application processor primarily processes an operating system, user interfaces, application programs, and the like. The modem processor primarily processes radio communication. It may be understood that the modem processor may alternatively be not integrated in the processor 1110.

The UE 1100 may further include the power supply 1111 (for example, a battery) supplying power to all components. Optionally, the power supply 1111 may be logically connected to the processor 1110 through a power management system. In this way, functions such as charge management, discharge management, and power consumption management are implemented by using the power management system.

In addition, the UE 1100 includes some functional modules that are not shown. Details are not described herein.

Optionally, an embodiment of the present invention further provides UE, including a processor 1110, a memory 1109, and a computer program stored in the memory 1109 and capable of running on the processor 1110, as shown in FIG. 11. When the computer program is executed by the processor 1110, each process of the foregoing method embodiment is implemented, with the same technical effect achieved. To avoid repetition, details are not described herein again.

Figure 12:
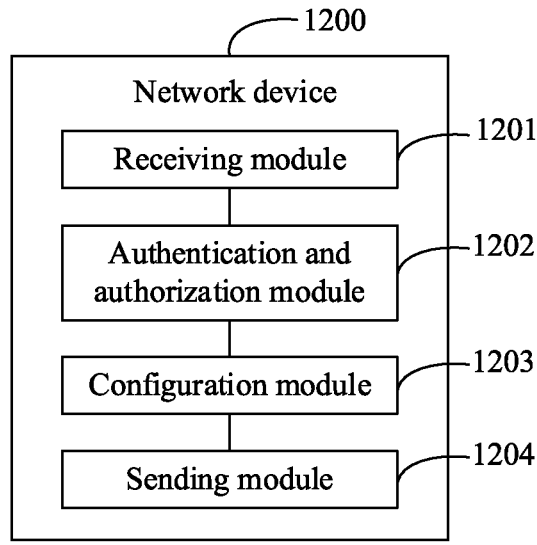
FIG. 12 is a schematic structural diagram of a network device according to an embodiment of the present invention.

FIG. 12 is a schematic diagram of a hardware structure of a network device for implementing an embodiment of the present invention. The network device 1200 includes a receiving module 1201, an authentication and authorization module 1202, a configuration module 1203, and a sending module 1204. The receiving module 1201 is configured to receive a relay connection service request message, where the relay connection service request message is used to request a relay connection service of a relay connection from source UE to target UE. The authentication and authorization module 1202 is configured to authenticate and authorize the relay connection service based on the relay connection service request message received by the receiving module 1201. The configuration module 1203 is configured to configure connection configuration parameters of the relay connection service, where the connection configuration parameters include a first connection configuration parameter, a target connection configuration parameter of each relay UE, and a second connection configuration parameter. The sending module 1204 is configured to send a relay connection service accept message, where the relay connection service accept message is used to indicate acceptance of the relay connection service request. The first connection configuration parameter is used for establishing a first direct communication connection between the source UE and next-hop relay UE of the source UE in a process of establishing the relay connection; the target connection configuration parameter is used for establishing a first target direct communication connection between corresponding relay UE and first UE and establishing a second target direct communication connection between the corresponding relay UE and second UE in the process of establishing the relay connection, where the first UE is the source UE or previous-hop relay UE of the corresponding relay UE, and the second UE is the target UE or next-hop relay UE of the corresponding relay UE; and the second connection configuration parameter is used for establishing a second direct communication connection between the target UE and previous-hop relay UE of the target UE in the process of establishing the relay connection.

Optionally, the relay connection service request message carries an identifier of the source UE, an identifier of each relay UE, an identifier of the target UE, requirement information of the relay connection service, and routing information of the relay connection service.

Optionally, the routing information is a routing table from the source UE to the target UE in the relay connection.

Optionally, before the configuration module 1203 configures the connection configuration parameters of the relay connection service, the authentication and authorization module 1202 is further configured to authorize each relay UE in the routing information based on the relay connection service request message and UE subscription information.

Optionally, after sending the relay connection service accept message, the sending module 1204 is further configured to: send the first connection configuration parameter to the source UE; send the corresponding target connection configuration parameter to each relay UE; and send the second connection configuration parameter to the target UE.

Optionally, before the sending module 1204 sends the first connection configuration parameter to the source UE, the receiving module 1201 is further configured to receive a first configuration request message from the source UE, where the first configuration request message is used to request the network device to configure the first connection configuration parameter for the source UE; before the sending module 1204 sends the corresponding target connection configuration parameter to each relay UE, the receiving module 1201 is further configured to receive a corresponding target configuration request message from each relay UE, where the target configuration request message is used to request the network device to configure the target connection configuration parameter for the corresponding relay UE; and before the sending module 1204 sends the second connection configuration parameter to the target UE, the receiving module 1201 is further configured to receive a second configuration request message from the target UE, where the second configuration request message is used to request the network device to configure the second connection configuration parameter for the target UE.

The network device provided in this embodiment of the present invention can implement each process shown in the foregoing method embodiment. To avoid repetition, details are not described herein again.

In this embodiment of the present invention, the network device may receive the relay connection service request message, authenticate and authorize the relay connection service based on the relay connection service request message, configure the connection configuration parameters of the relay connection service, and send the relay connection service accept message, where the relay connection service request message is used to request the relay connection service of the relay connection from the source UE to the target UE; the connection configuration parameters include the first connection configuration parameter, the target connection configuration parameter of each relay UE, and the second connection configuration parameter; and the relay connection service accept message is used to indicate acceptance of the relay connection service request, where the first connection configuration parameter is used for establishing the first direct communication connection between the source UE and the next-hop relay UE of the source UE in the process of establishing the relay connection; the target connection configuration parameter is used for establishing the first target direct communication connection between the corresponding relay UE and the first UE and establishing the second target direct communication connection between the corresponding relay UE and the second UE in the process of establishing the relay connection, where the first UE is the source UE or the previous-hop relay UE of the corresponding relay UE, and the second UE is the target UE or the next-hop relay UE of the corresponding relay UE; and the second connection configuration parameter is used for establishing the second direct communication connection between the target UE and the previous-hop relay UE of the target UE in the process of establishing the relay connection. In this solution, the relay connection from the source UE to the target UE can be established. In this way, communication quality of the connection established between the UEs can be improved.

Figure 13:
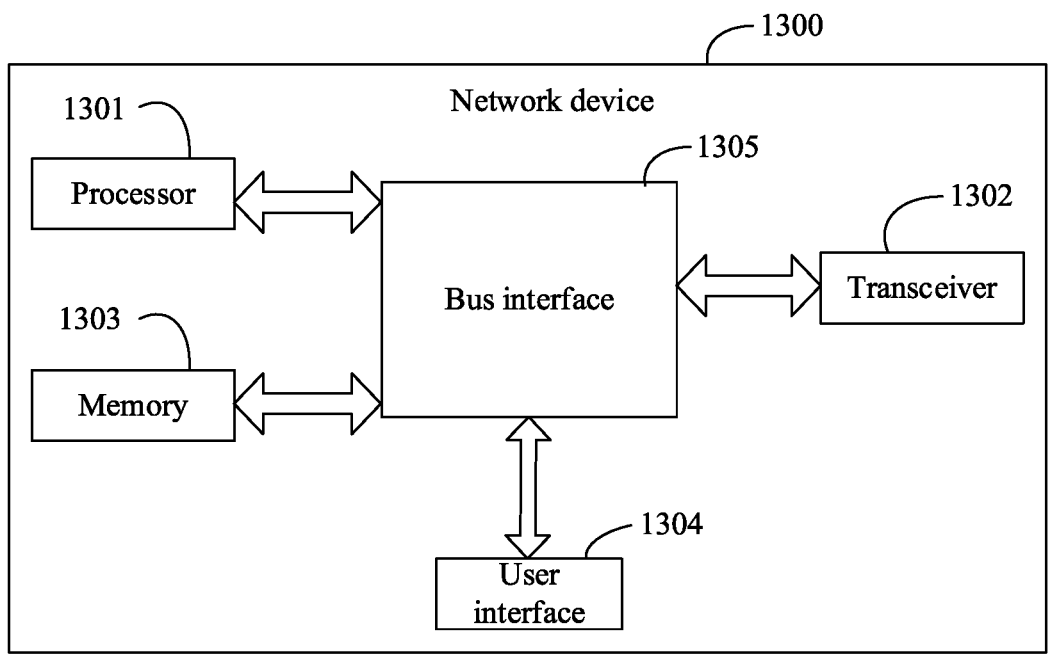
FIG. 13 is a schematic hardware diagram of a network device according to an embodiment of the present invention.

FIG. 13 is a schematic diagram of a hardware structure of a network device for implementing an embodiment of the present invention. The network device 1300 is a target network device to which a target cell belongs, and the network device 1300 includes a processor 1301, a transceiver 1302, a memory 1303, a user interface 1304, and a bus interface 1305.

The transceiver 1302 is configured to receive a relay connection service request message, where the relay connection service request message is used to request a relay connection service of a relay connection from source UE to target UE. The processor 1301 is configured to authenticate and authorize the relay connection service based on the received relay connection service request message, and configure connection configuration parameters of the relay connection service, where the connection configuration parameters include a first connection configuration parameter, a target connection configuration parameter of each relay UE, and a second connection configuration parameter. The transceiver 1302 is further configured to send a relay connection service accept message, where the relay connection service accept message is used to indicate acceptance of the relay connection service request, where the first connection configuration parameter is used for establishing a first direct communication connection between the source UE and next-hop relay UE of the source UE in a process of establishing the relay connection; the target connection configuration parameter is used for establishing a first target direct communication connection between corresponding relay UE and first UE and establishing a second target direct communication connection between the corresponding relay UE and second UE in the process of establishing the relay connection, where the first UE is the source UE or previous-hop relay UE of the corresponding relay UE, and the second UE is the target UE or next-hop relay UE of the corresponding relay UE; and the second connection configuration parameter is used for establishing a second direct communication connection between the target UE and previous-hop relay UE of the target UE in the process of establishing the relay connection.

In this embodiment of the present invention, the network device may receive the relay connection service request message, authenticate and authorize the relay connection service based on the relay connection service request message, configure the connection configuration parameters of the relay connection service, and send the relay connection service accept message, where the relay connection service request message is used to request the relay connection service of the relay connection from the source UE to the target UE; the connection configuration parameters include the first connection configuration parameter, the target connection configuration parameter of each relay UE, and the second connection configuration parameter; and the relay connection service accept message is used to indicate acceptance of the relay connection service request, where the first connection configuration parameter is used for establishing the first direct communication connection between the source UE and the next-hop relay UE of the source UE in the process of establishing the relay connection; the target connection configuration parameter is used for establishing the first target direct communication connection between the corresponding relay UE and the first UE and establishing the second target direct communication connection between the corresponding relay UE and the second UE in the process of establishing the relay connection, where the first UE is the source UE or the previous-hop relay UE of the corresponding relay UE, and the second UE is the target UE or the next-hop relay UE of the corresponding relay UE; and the second connection configuration parameter is used for establishing the second direct communication connection between the target UE and the previous-hop relay UE of the target UE in the process of establishing the relay connection. In this solution, the relay connection from the source UE to the target UE can be established. In this way, communication quality of the connection established between the UEs can be improved.

In this embodiment of the present invention, in FIG. 13, a bus architecture may include any quantity of interconnect buses and bridges, specifically for interconnecting various circuits of one or more processors represented by the processor 1301 and a memory represented by the memory 1303. The bus architecture may further interconnect various other circuits such as a peripheral device, a voltage regulator, and a power management circuit. These are all well known in the art, and therefore are not further described in this specification. The bus interface provides an interface. The transceiver 1302 may be a plurality of components, including a transmitter and a receiver, and provides units for communicating with a variety of other apparatuses on a transmission medium. For different UEs, the user interface 1304 may also be an interface that can be externally or internally connected to a required device. The connected device includes but is not limited to a keypad, a display, a speaker, a microphone, a joystick, and the like. The processor 1301 is responsible for management of the bus architecture and general processing, and the memory 1303 is capable of storing data that is used by the processor 1301 during operation.

In addition, the network device 1300 includes some functional modules that are not shown. Details are not described herein.

Optionally, an embodiment of the present invention further provides a network device, including a processor 1301, a memory 1303, and a computer program stored in the memory 1303 and capable of running on the processor 1301, as shown in FIG. 13. When the computer program is executed by the processor 1301, each process of the foregoing method embodiment can be implemented, with the same technical effect achieved. To avoid repetition, details are not described herein again.

An embodiment of the present invention further provides a communications system, where the communications system includes the UE in the foregoing embodiment and the network device.

An embodiment of the present invention further provides a computer-readable storage medium. The computer-readable storage medium stores a computer program. When the computer program is executed by the processor 1110 shown in FIG. 11 and/or the processor 1301 shown in FIG. 13, each process of the foregoing method embodiment is implemented, with the same technical effect achieved. To avoid repetition, details are not described herein again. The computer-readable storage medium is, for example, a read-only memory (Read-Only Memory, ROM for short), a random access memory (Random Access Memory, RAM for short), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially, or the part contributing to the prior art may be implemented in a form of a software product. The computer software product is stored in a storage medium (for example, a ROM/RAM, a magnetic disk, or an optical disc), and includes several instructions for instructing a terminal device (which may be a mobile phone, a computer, a server, an air conditioner, a network device, or the like) to perform the method described in the embodiments of the present invention.

The embodiments of the present invention are described above with reference to the accompanying drawings, but the present invention is not limited to the embodiments. The embodiments are only illustrative rather than restrictive. Inspired by the present invention, a person of ordinary skill in the art can still derive a plurality of variations without departing from the essence of the present invention and the protection scope of the claims. All these variations shall fall within the protection of the present invention.

What is claimed is:

1. A relay connection establishment method, wherein the method comprises:

receiving, by a source UE, a first connection configuration parameter from a network device;

sending, by the source user equipment UE, a first direct communication request message to next-hop relay UE of the source UE according to the first connection configuration parameter, wherein the first direct communication request message is used to request to establish, in a process of establishing a relay connection from the source UE to target UE, a first direct communication connection between the source UE and the next-hop relay UE of the source UE, wherein the relay connection from the source UE to the target UE is a relay connection from the source UE to the target UE relayed via at least one relay UE comprising the next-hop relay UE of the source UE; and receiving, by the source UE, a first direct communication accept message from the next-hop relay UE of the source UE, wherein the first direct communication accept message is used to indicate acceptance of the request for establishing, in the process of establishing the relay connection, the first direct communication connection.

2. The method according to claim 1, wherein the first direct communication request message and the first direct communication accept message both carry an identifier of the source UE, an identifier of the next-hop relay UE of the source UE, and an identifier of the target UE.

3. The method according to claim 1, wherein before the receiving, by the source UE, the first connection configuration parameter from a network device, the method comprises:

sending, by the source UE, a first configuration request message to the network device, wherein the first configuration request message is used to request the network device to configure the first connection configuration parameter for the source UE.

4. A relay connection establishment method, wherein the method comprises:

receiving, by a target relay user equipment UE, a first target direct communication request message from a first UE, wherein the first UE is a source UE or a previous-hop relay UE of the target relay UE, and the first target direct communication request message is used to request to establish, in a process of establishing a relay connection from the source UE to target UE, a first target direct communication connection between the first UE and the target relay UE, wherein the relay connection from the source UE to the target UE is a relay connection from the source UE to the target UE relayed via at least one relay UE comprising the target relay UE;

receiving, by the target relay UE, a target connection configuration parameter from a network device;

sending, by the target relay UE, a second target direct communication request message to second UE according to the target connection configuration parameter, wherein the second UE is the target UE or next-hop relay UE of the target relay UE, and the second target direct communication request message is used to request to establish, in the process of establishing the relay connection, a second target direct communication connection between the target relay UE and the second UE;

receiving, by the target relay UE, a second target direct communication accept message from the second UE, wherein the second target direct communication accept message is used to indicate acceptance of the request for establishing, in the process of establishing the relay connection, the second target direct communication connection; and sending, by the target relay UE, a first target direct communication accept message to the first UE, wherein the first target direct communication accept message is used to indicate acceptance of the request for establishing, in the process of establishing the relay connection, the first target direct communication connection.

5. The method according to claim 4, wherein in a case in which the first UE is the source UE, the first target direct communication request message and the first target direct communication accept message both carry an identifier of the source UE, an identifier of the target relay UE, and an identifier of the target UE;

in a case in which the first UE is the previous-hop relay UE of the target relay UE, the first target direct communication request message and the first target direct communication accept message both carry an identifier of the source UE, an identifier of the first UE, an identifier of the target relay UE, and an identifier of the target UE;

in a case in which the second UE is the target UE, the second target direct communication request message and the second target direct communication accept message both carry an identifier of the source UE, an identifier of the target relay UE, and an identifier of the target UE; or in a case in which the second UE is the next-hop relay UE of the target relay UE, the second target direct communication request message and the second target direct communication accept message both carry an identifier of the source UE, an identifier of the target relay UE, an identifier of the second UE, and an identifier of the target UE.

6. The method according to claim 4, wherein before the receiving, by the target relay UE, the target connection configuration parameter from a network device, the method comprises:

sending, by the target relay UE, a target configuration request message to the network device, wherein the target configuration request message is used to request the network device to configure the target connection configuration parameter for the target relay UE.

7. A relay connection establishment method, wherein the method comprises:

receiving, by a target user equipment UE, a second direct communication request message from a previous-hop relay UE of the target UE, wherein the second direct communication request message is used to request to establish, in a process of establishing a relay connection from a source UE to the target UE, a second direct communication connection between the target UE and the previous-hop relay UE of the target UE, wherein the relay connection from the source UE to the target UE is a relay connection from the source UE to the target UE relayed via at least one relay UE comprising the previous-hop relay UE of the target UE;

receiving, by the target UE, a second connection configuration parameter from a network device; and sending, by the target UE, a second direct communication accept message to the previous-hop relay UE of the target UE according to the second connection configuration parameter, wherein the second direct communication accept message is used to indicate acceptance of the request for establishing the second direct communication connection in the process of establishing the relay connection.

8. The method according to claim 7, wherein the second direct communication request message and the second direct communication accept message both carry an identifier of the source UE, an identifier of the previous-hop relay UE of the target UE, and an identifier of the target UE.

9. The method according to claim 7, wherein before the receiving, by the target UE, the second connection configuration parameter from a network device, the method comprises:

sending, by the target UE, a second configuration request message to the network device, wherein the second configuration request message is used to request the network device to configure the second connection configuration parameter for the target UE.

10. User equipment UE, wherein the UE is source UE and comprises a processor, a memory, and a computer program stored in the memory and capable of running on the processor, wherein the computer program, when being executed by the processor, implements steps of the relay connection establishment method according to claim 1.

11. User equipment UE, wherein the UE is target relay UE and comprises a memory, a processor, and a computer program stored in the memory and capable of running on the processor, wherein the computer program, when being executed by the processor, implements steps of the relay connection establishment method according to claim 4.

12. User equipment UE, wherein the UE is target UE and comprises a processor, a memory, and a computer program stored in the memory and capable of running on the processor, wherein the computer program, when being executed by the processor, implements steps of the relay connection establishment method according to claim 7.

13. A non-transitory computer-readable storage medium, wherein the computer-readable storage medium stores a computer program, and the computer program, when being executed by a processor, implements steps of the relay connection establishment method according to claim 1.

14. A non-transitory computer-readable storage medium, wherein the computer-readable storage medium stores a computer program, and the computer program, when being executed by a processor, implements steps of the relay connection establishment method according to claim 4.

* * * * *